US012615572B2

(12) United States Patent
Shimezawa et al.

(10) Patent No.: US 12,615,572 B2
(45) Date of Patent: Apr. 28, 2026

(54) WIRELESS COMMUNICATION DEVICE, BASE STATION, COMMUNICATION SYSTEM, AND COMMUNICATION METHOD

(71) Applicant: SONY GROUP CORPORATION, Tokyo (JP)

(72) Inventors: Kazuyuki Shimezawa, Tokyo (JP); Hiromasa Uchiyama, Tokyo (JP); Naoki Kusashima, Tokyo (JP); Ren Sugai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 307 days.

(21) Appl. No.: 18/260,525

(22) PCT Filed: Dec. 27, 2021

(86) PCT No.: PCT/JP2021/048485
§ 371 (c)(1),
(2) Date: Jul. 6, 2023

(87) PCT Pub. No.: WO2022/153855
PCT Pub. Date: Jul. 21, 2022

(65) Prior Publication Data
US 2024/0073778 A1 Feb. 29, 2024

(30) Foreign Application Priority Data

Jan. 14, 2021 (JP) ................................. 2021-004532

(51) Int. Cl.
*H04W 4/00* (2018.01)
*H04W 40/22* (2009.01)
*H04W 92/18* (2009.01)
(52) U.S. Cl.
CPC ............ *H04W 40/22* (2013.01); *H04W 92/18* (2013.01)

(58) Field of Classification Search
CPC ... H04W 40/22; H04W 92/18; H04W 36/037; H04W 8/24; H04W 88/04; H04W 76/14; H04W 84/20
See application file for complete search history.

(56) References Cited

U.S. PATENT DOCUMENTS

| | | | |
|---|---|---|---|
| 2014/0321355 A1* | 10/2014 | Choi ................... | H04B 7/15507 370/315 |
| 2014/0335853 A1* | 11/2014 | Sartori ................ | H04W 56/002 455/552.1 |

(Continued)

FOREIGN PATENT DOCUMENTS

WO 2015/141020 A1 9/2015

OTHER PUBLICATIONS

NTT Docomo et al: "Sidelink resource allocation mechanism for NR V2X", R1-1900965_SL Resource Allocation, 3rd Generation Partnership Project (3GPP), Jan. 21, 2019-Jan. 25, 2019 Jan. 20, 2019,Mobile Competence Centre ; 650, Route Des Lucioles ; F-06921 Sophia-Antipolis Cedex ; France, vol. RAN WG1,No. Taipei; XP051593810.

(Continued)

*Primary Examiner* — Omoniyi Obayanju
(74) *Attorney, Agent, or Firm* — CHIP LAW GROUP

(57) ABSTRACT

A wireless communication device performs sidelink communication by a plurality of the wireless communication devices. The wireless communication device includes a control unit. The control unit acquires determination information for determining a plurality of master devices that communicate with a base station in sidelink communication. The control unit determines whether or not an own device is one of the plurality of master devices based on the determination information.

12 Claims, 8 Drawing Sheets

(56)          References Cited

U.S. PATENT DOCUMENTS

| | | | |
|---|---|---|---|
| 2020/0037343 A1 | 1/2020 | He et al. | |
| 2020/0314612 A1 | 10/2020 | Kang | |
| 2023/0300713 A1* | 9/2023 | Hoang | H04W 40/24 |
| | | | 370/254 |

OTHER PUBLICATIONS

Spreadtrum Communications: "Discussion on resource allocation for mode 2": R1-1813085; Discussion on Resource Allocation for Mode 2, 3rd Generation Partnership Project (3GPP), Nov. 12, 2018-Nov. 16, 2018 Nov. 11, 2018,Mobile Competence Centre ; 650, Route Des Lucioles ;F-06921 Sophia-Antipolis Cedex ; France. vol. RAN WG1, No. Spokane, USA: XP051555066.

International Search Report and Written Opinion of PCT Application No. PCT/JP2021/048485, issued on Mar. 1, 2022, 08 pages of ISRWO.
"Technical Specification Group Services and System Aspects; Service requirements for cyber-physical control applications in vertical domains", 3GPP TS 22.104 V17.4.0 (Sep. 2020), Release 17, 76 pages.
"Discussion on NR Sidelink Resource Allocation for Mode 2", 3GPPTSG RAN WG1, Meeting 96bis, R1-1905077, Apr. 8-12, 2019, 08 pages.
"Discussion on mode-2 resource allocation mechanism", Beijing University of Post and Telecommunication, 3GPP TSG RAN WG1, Meeting 99, R1-1912422, Nov. 18-22, 2019, 04 pages.
"Technical Specification Group Services and System Aspects; Enhancement of 3GPP support for V2X scenarios", 3GPP TS 22.186 V16.2.0 (Jun. 2019), 18 pages.

* cited by examiner

WIRELESS COMMUNICATION DEVICE, BASE STATION, COMMUNICATION SYSTEM, AND COMMUNICATION METHOD

CROSS REFERENCE TO RELATED APPLICATIONS

This application is a U.S. National Phase of International Patent Application No. PCT/JP2021/048485 filed on Dec. 27, 2021, which claims priority benefit of Japanese Patent Application No. JP 2021-004532 filed in the Japan Patent Office on Jan. 14, 2021. Each of the above-referenced applications is hereby incorporated herein by reference in its entirety.

FIELD

The present disclosure relates to a wireless communication device, a base station, a communication system, and a communication method.

BACKGROUND

In 3GPP, device-to-device (D2D) communication for performing direct communication between terminals (UEs) is standardized as sidelink communication by 4G long term evolution (LTE) and 5G new radio (NR), respectively. In the sidelink communication, vehicle-to-everything (V2X) communication is one of main use cases. As the V2X communication, vehicle-to-vehicle (V2V), vehicle-to-infrastructure (V2I), vehicle-to-pedestrian (V2P), and vehicle-to-network (V2N) are assumed.

Particularly, platooning, advanced driving, extended sensor, and remote driving have been studied as specific use cases of V2X communication in 5G NR. In addition, as a requirement for URLLC in V2X communication, a standard is formulated so as to realize a delay of 10 milliseconds or less and reliability of 99.999%.

Further, the sidelink communication is not limited to the V2X communication, and can be used in various use cases. For example, an automation factory is one of use cases in which the sidelink communication can be utilized. In such a factory, it is considered that a large number of devices such as sensors and cameras are installed and directly communicate with each other.

CITATION LIST

Non Patent Literature

Non Patent Literature 1: "3GPP TS22.186 version 16.2.0 Release 16", [online], [searched on Jan. 7, 2021], Internet <https://www.3gpp.org/ftp//Specs/archive/22_series/22.186/22186-g20.zip>
Non Patent Literature 2: "3GPP TS22.104 version 17.4.0 Release 17", [online], [Searched on Jan. 7, 2021], Internet <https://www.3gpp.org/ftp//Specs/archive/22_series/22.104/22104-h40.zip>

SUMMARY

Technical Problem

As described above, although inter-vehicle communication has been considered in conventional V2X communication, intra-vehicle communication can be proposed as a technology extension in future sidelink communication. In the intra-vehicle communication, for example, sensors and camera modules that have been connected to each other by wire can be connected to each other by wireless communication as wireless communication devices. Particularly, it is expected that the number of such devices such as sensors and camera modules will rapidly increase as the realization of automatic driving and the like progresses in the future. Therefore, it is considered that there is an increasing demand for connecting such sensors and camera modules to each other by wireless communication.

Here, in consideration of automatic driving, it is basically important to control an automobile based on data from a sensor or a camera in the vehicle, and information obtained by inter-vehicle communication (that is, the existing V2X communication) is utilized as auxiliary information. Therefore, the intra-vehicle communication is required to have lower delay and higher reliability than the conventional inter-vehicle communication.

In addition, in the automation factory described above as well, particularly in a case where the production line is frequently changed according to what is to be manufactured, further low delay and high reliability are required.

As described above, further low delay and high reliability are required in sidelink communication.

Therefore, the present disclosure provides a mechanism capable of implementing sidelink communication with lower delay and higher reliability.

It is noted that the above-described problem or object is merely one of a plurality of problems or objects that can be solved or achieved by a plurality of embodiments disclosed in the present specification.

Solution to Problem

According to the present disclosure, a wireless communication device is provided. The wireless communication device performs sidelink communication by a plurality of the wireless communication devices. The wireless communication device includes a control unit. The control unit acquires determination information for determining a plurality of master devices that communicate with a base station in sidelink communication. The control unit determines whether or not an own device is one of the plurality of master devices based on the determination information.

DESCRIPTION OF EMBODIMENTS

Figure 1:
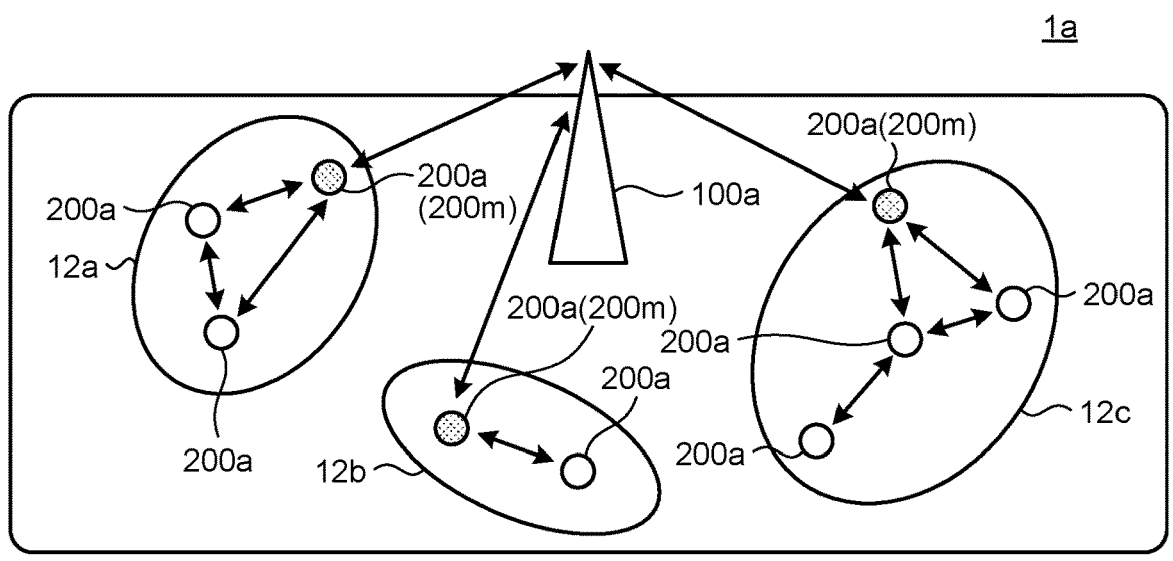
FIG. 1 is a diagram illustrating an example of a communication system that performs sidelink communication.

Hereinafter, embodiments of the present disclosure will be described in detail with reference to the accompanying drawings. It is noted that, in the present specification and the drawings, components having substantially the same functional configuration are denoted by the same reference numerals, and redundant description is omitted.

Furthermore, in the present specification and the drawings, similar components of the embodiments may be distinguished by adding different alphabets or numbers after the same reference numerals. However, in a case where it is not necessary to particularly distinguish each of similar components, only the same reference numeral is assigned.

One or more embodiments (including examples and modifications) described below can each be implemented independently. On the other hand, at least some of the plurality of embodiments described below may be appropriately combined with at least some of other embodiments to be implemented. The plurality of embodiments may include novel features different from each other. Therefore, the plurality of embodiments can contribute to solving different objects or problems, and can exhibit different effects.

In addition, sidelink communication in the present specification and the drawings is basically based on wireless access systems of LTE V2X and NR V2X. It is noted that LTE V2X and NR V2X are described in 3GPP TR 37.985.

It is noted that the description will be given in the following order.

1. Introduction
1.1. Example of sidelink communication
1.2. Problem
1.3. Outline of proposed technology
2. Configuration of communication system
2.1. Overall configuration of communication system
2.2. Configuration of base station
2.3. Configuration of terminal device
3. Method of determining plurality of master UEs
3.1. Determination method by terminal device
3.2. Determination method by base station
3.3. Others
4. Type of master UE
5. Other embodiments
6. Application example
7. Summary

1. Introduction

Prior to describing the embodiments of the present disclosure in detail, the background of the embodiments of the present disclosure will be described. As a background of the embodiment, first, an example of sidelink communication will be briefly described.

<1.1. Example of Sidelink Communication>

FIG. 1 is a diagram illustrating an example of a communication system 1*a* that performs sidelink communication. The communication system 1*a* illustrated in FIG. 1 includes a base station 100*a* and a plurality of terminal devices 200*a*.

The plurality of terminal devices 200*a* are, for example, smartphones, sensors, camera devices, and the like, and are divided into groups that perform sidelink communication with each other in a predetermined area. In the example of FIG. 1, the plurality of terminal devices 200*a* are divided into three groups 12*a* to 12*c*. The plurality of terminal devices 200*a* included in the same group share data by performing sidelink communication with each other. For example, in intra-vehicle communication, grouping is performed such that the plurality of terminal devices 200*a* (for example, a sensor or the like) mounted on the same automobile are included in one group.

In the communication system 1*a*, one of the plurality of terminal devices 200*a* belonging to one group is set as a representative device (hereinafter, the same is also referred to as a master UE 200*m*). When performing communication with the base station 100*a*, the plurality of terminal devices 200*a* perform communication via the master UE 200*m*. That is, the master UE 200*m* communicates with the base station 100*a* as a representative of the group. Such communication may be sidelink communication, downlink communication, or uplink communication.

Here, the master UE 200*m* communicates with the base station 100*a* as a representative of the group, but the present disclosure is not limited thereto. For example, the master UE 200*m* may be a control terminal configured to control the inside of a predetermined area. Hereinafter, when simply described as a base station 100, the control terminal is also included.

As described above, in the sidelink communication, a communication method in the group by the master UE 200*m* and a method of selecting the master UE 200*m* are disclosed in, for example, WO 2014/119099 A and WO 2014/119112 A.

<1.2. Problem>

As described above, in the communication system 1*a*, the master UE 200*m* as a representative of the group communicates with the base station 100*a*. When the communication environment between the master UE 200*m* and the base station 100*a* deteriorates, reselection of the master UE 200*m*, reconstruction of the network in the group, and the like may occur. Therefore, a communication delay occurs until the communication between the master UE 200*m* and the base station 100*a* is resumed.

Such a delay has a large influence particularly on a use case in which low delay and high reliability (URLLC) are important, and may affect communication of the entire network in the group.

As a method of suppressing such a delay, consideration is given as to a method of allowing all the terminal devices 200*a* in the group to communicate with the base station 100*a*. However, in this method, since many terminal devices 200*a* communicate with the base station 100*a*, frequency utilization efficiency decreases. Furthermore, in a case where the terminal device 200*a* and the base station device 100*a* perform sidelink communication, wireless resources become congested, and a collision probability of transmission data increases, so that there is a possibility that a data transmission delay occurs.

<1.3. Outline of Proposed Technology>

Therefore, in the technology of the present disclosure, a plurality of master UEs (an example of a master device) are set in one group, and the plurality of master UEs and the base station communicate with each other. As a result, in the technology of the present disclosure, it is possible to provide redundancy in communication with the base station.

Therefore, for example, even if a communication link between one master UE and the base station is cut off, communication with the base station can be continued by another communication link. As a result, the reliability of communication can be improved.

In addition, it is not necessary to reselect the master UE from the plurality of terminal devices in the group, and it is also not necessary to perform reconnection processing to the base station by the master UE, thereby making it possible to omit the time required to continue communication with the base station and to realize a low delay.

Although the outline of the present embodiment has been described above, the communication system according to the present embodiment will be described in detail below.

2. Configuration of Communication System

<2.1. Overall Configuration of Communication System>

Figure 2:
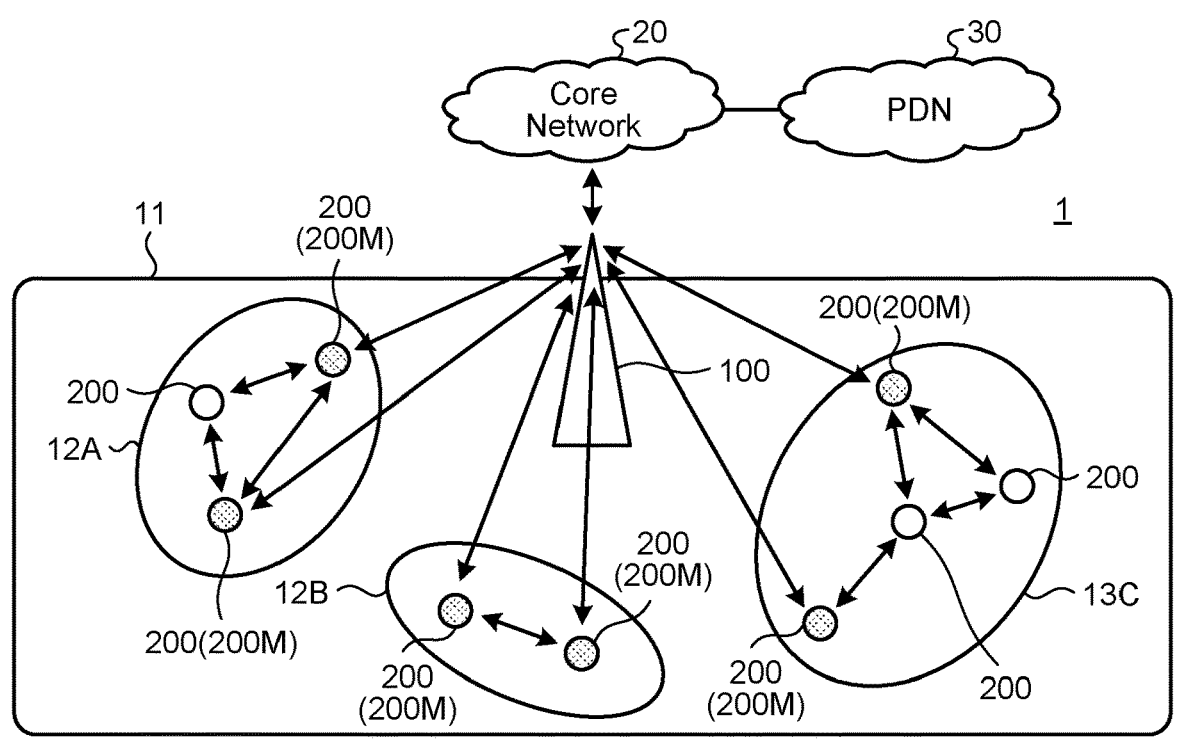
FIG. 2 is a diagram illustrating an example of a schematic configuration of a communication system according to an embodiment of the present disclosure.

Next, an example of a schematic configuration of a system to which the proposed technology is applied will be described with reference to FIG. 2. FIG. 2 is a diagram illustrating an example of a schematic configuration of a communication system 1 according to an embodiment of the present disclosure. As illustrated in FIG. 2, the system 1 includes a base station 100, a terminal device 200, a core network (Core Network) 20, and a packet data network (PDN) 30.

Here, the communication system 1 may be a cellular communication system such as wideband code division multiple Access (W-CDMA), code division multiple access 2000 (cdma 2000), LTE, or NR. In the following descriptions, "LTE" includes LTE-advanced (LTE-A), LTE-advanced pro (LTE-A Pro), and evolved universal terrestrial radio access (EUTRA). In addition, "NR" includes a new radio access technology (NRAT) and further EUTRA (FEUTRA).

NR is a next generation (fifth generation) radio access technology (RAT) of LTE. The NR is a wireless access technology capable of supporting various use cases including enhanced mobile broadband (eMBB), massive machine type communications (mMTC), and ultra-reliable and low latency communications (URLLC).

It is noted that the communication system 1 is not limited to the cellular communication system. For example, the communication system 2 may be another wireless communication system such as a wireless local area network (LAN) system, a television broadcasting system, an aviation wireless system, or a space wireless communication system.

The base station 100 is a communication device configured to operate a cell 11 and provide a wireless service to one or more terminal devices 200 located within the coverage of the cell 11. The cell 11 can be operated according to any wireless communication scheme such as LTE or NR. The base station 100 is connected to the core network 20. The core network 20 is connected to the PDN 30.

It is noted that the base station 100 may include a set of a plurality of physical or logical devices. For example, in the embodiment of the present disclosure, the base station 100 may be distinguished into a plurality of devices of a baseband unit (BBU) and a radio unit (RU), and may be interpreted as an assembly of the plurality of devices. Additionally or alternatively, in the embodiments of the present disclosure, the base station 100 may be either or both of the BBU and the RU. The BBU and the RU may be connected by a predetermined interface (for example, eCPRI). Additionally or alternatively, RU may be referred to as a remote radio unit (RRU) or Radio DoT (RD). Additionally or alternatively, the RU may correspond to a gNB-DU to be described later. Additionally or alternatively, the BBU may correspond to a gNB-CU to be described later. Additionally or alternatively, the RU may be a device formed to be integrated with an antenna. An antenna (for example, an antenna formed to be integrated with the RU) included in the base station may adopt an advanced antenna system and support MIMO (for example, FD-MIMO) or beamforming. In the advanced antenna system, an antenna (for, example, an antenna formed to be integrated with the RU) included in the base station 100 may include, for example, 64 transmission antenna ports and 64 reception antenna ports.

Furthermore, a plurality of the base stations 100 may be connected to each other. The one or more base stations 100 may be included in a radio access network (RAN). That is, the base station 100 may be simply referred to as a RAN, a RAN node, an access network (AN), or an AN node. The RAN in LTE is referred to as an enhanced universal terrestrial RAN (EUTRAN). The RAN in NR is referred to as NGRAN. The RAN in the W-CDMA (UMTS) is referred to as UTRAN. The base station 100 in LTE is referred to as an evolved node B (eNodeB) or an eNB. That is, the EUTRAN includes one or more eNodeBs (eNBs). Furthermore, the base station 100 of NR is referred to as a gNodeB or a gNB. That is, the NGRAN includes one or more gNBs. Further, the EUTRAN may include a gNB (en-gNB) connected to a core network (EPC) in an LTE communication system (EPS). Similarly, the NGRAN may include an ng-eNB connected to a core network 5GC in a 5G communication system (5GS). Additionally or alternatively, when the base station 100 is an eNB, a gNB, or the like, the same may be referred to as 3GPP Access. Additionally or alternatively, when the base station 100 is a wireless access point (Access Point), the same may be referred to as Non-3GPP Access. Additionally or alternatively, additionally or alternatively, the base station 100 may be an optical extension device referred to as a remote radio head (RRH). Additionally or alternatively, in a case where the base station 100 is a gNB, the base station 100 may be referred to as a combination of the above-described gNB central unit (CU) and gNB distributed unit (DU) or any one of them. The gNB central unit (CU) hosts a plurality of upper layers (for example, RRC, SDAP, and PDCP) of the access stratum for communication with the UE. On the other hand, the gNB-DU hosts a plurality of lower layers (for example, RLC, MAC, and PHY) of the access stratum. That is, among messages and information to be described later, RRC signalling (for example, various SIBs including an MIB and an SIB1, an RRCSetup message, and an RRCReconfiguration message) may be generated by the gNB CU. Meanwhile DCI and various physical channels (for example, PDCCH and PBCH) to be described later may be generated by the gNB-DU. Alternatively, in the RRC signalling, for example, some configurations such as IE: cellGroupConfig may be generated by the gNB-DU, and the remaining configurations may be generated by the gNB-CU. These configurations may be transmitted and received by an F1 interface to be described later. The base station 100 may be configured to be able to communicate with another base station 100. For example, when a plurality of base station 100 devices are eNBs or a combination of an eNB and an en-gNB, the base stations 100 may be connected to each other by an X2 interface. Additionally or alternatively, when the plurality of base stations 100 are gNBs or a combination of a gn-eNB and a gNB, the devices may be connected to each other by an Xn interface. Additionally or alternatively, in a case where the plurality of base stations 100 are a combination of a gNB central unit (CU) and a gNB distributed unit (DU), the devices may be connected to each other by the above-described F1 interface. A message and information (RRC signalling or DCI information, and physical channel) to be described later may be communicated between a plurality of base stations (for example, via the X2, the Xn, and the F1 interface).

Further, as described above, the base station 100 may be configured to manage a plurality of cells. A cell provided by the base station 100 is referred to as a serving cell. The serving cell includes a primary cell (PCell) and a secondary cell (SCell). In a case where the dual connectivity (for example, EUTRA-EUTRA dual connectivity, EUTRA-NR dual connectivity (ENDC), EUTRA-NR dual connectivity with 5GC, and NR-EUTRA dual connectivity (NEDC), and NR-NR dual connectivity) is provided to the UE (for example, the terminal device 200), the PCell and zero or one or more SCells(s) provided by a master node (MN) are referred to as a master cell group. Further, the serving cell may include a primary secondary cell or a primary SCG Cell (PSCell). In other words, in a case where the dual connectivity is provided to the UE, the PSCell and zero or one or more SCells(s) provided by a secondary node (SN) are referred to as a secondary cell group (SCG). Unless specially configured (for example, PUCCH on SCell), a physical uplink control channel (PUCCH) is transmitted in the PCell and the PSCell, but the same is not transmitted in the SCell. In addition, radio link failure is also detected in the PCell and the PSCell, but the same is not detected in the SCell (may not be detected). As described above, since the PCell and the PSCell have a special role in the serving cell(s), the same are also referred to as special cells (SpCells). One downlink component carrier and one uplink component carrier may be associated with one cell. In addition, a system bandwidth corresponding to one cell may be divided into a plurality of bandwidth parts. In this case, one or more bandwidth parts may be configured for the UE, and one bandwidth part may be used for the UE as an Active BWP. In addition, wireless resources (for example, a frequency band, a numerology (subcarrier spacing), and a slot format (slot configuration)) that can be used by the terminal device 200 may be different for each cell, each component carrier, or each BWP.

When the core network 120 is an NR core network (5G Core (5GC)), the core network 120 may include an access and mobility management function (AMF), a session management function (SMF), a user plane function (UPF), a policy control function (PCF), and a unified data management (UDM).

When the core network 120 is an LTE core network (evolved packet core (EPC)), the core network 120 may include a mobility management entity (MME), a serving gateway (S-GW), a PDN gateway (P-GW), a policy and charging rule function (PCRF), and a home subscriber server (HSS). The AMF and the MME are control nodes configured to handle a control plane signal, and manage a mobility state of the terminal device 40. The UPF and the S-GW/P-GW are nodes configured to handle a user plane signal. The PCF/PCRF is a control node configured to perform control related to a policy and charging such as quality of service (QoS) for a PDU session or a bearer. The UDM/HSS is a control node configured to handle subscriber data and perform service control.

The terminal device 200 is a wireless communication device that wirelessly communicates with other devices. The terminal device 110 is, for example, a sensor or a camera device having a communication function, a mobile phone, a smart device (smartphone or tablet), a personal digital assistant (PDA), or a personal computer. The terminal device 110 may be a head mounted display having a function of wirelessly transmitting and receiving data, VR goggles, or the like.

For example, the terminal device 200 wirelessly communicates with another terminal device 200 based on control by the base station 100 or autonomously. In this case, the terminal device 200 transmits a sidelink signal to another terminal device 200 in the PC5 link, and receives the sidelink signal from the other terminal device 200. Hereinafter, the transmission and reception of the sidelink signal by the terminal device 200 will be collectively referred to as sidelink communication. The terminal device 200 may be able to use an automatic retransmission technology such as hybrid automatic repeat request (HARQ) when the sidelink communication is performed.

In the communication system 1, a plurality of terminal devices 200 are classified into at least one group, and the sidelink communication is performed in the group. In the example of FIG. 2, the plurality of terminal devices 200 are divided into three groups 12A to 12C, and the sidelink communication is performed in each group 12.

In addition, among the terminal devices 200 included in the group 12, the plurality of terminal devices 200 wirelessly communicate with the base station 100 based on control by the base station 100. The terminal device 200 that performs wireless communication with the base station 100 as a representative of the group in this manner is referred to as a representative terminal device or a master UE 200M.

In the embodiment of the present disclosure, a plurality of master UEs 200M are included in the group 12. The plurality of master UEs 200M perform duplex communication or multiplication communication with the base station 100. FIG. 2 illustrates a case where two master UEs 200M exist for each of the groups 12A to 12C, but the number of the master UEs 200M is not limited to two and may be three or more.

It is noted that the plurality of master UEs 200M may be autonomously determined by the plurality of terminal devices 200 in the group 12, or may be determined by a device outside the group 12 such as the base station 100. A method of determining the plurality of master UEs 200M will be described later.

The terminal device 200, which is the master UE 200M, may be able to perform non-orthogonal multiple access (NOMA) communication with the base station device 130. It is noted that the terminal device 200 may also be capable of performing NOMA communication in communication (sidelink) with another terminal device 200. Furthermore, the terminal device 200 may be able to perform low power wide area (LPWA) communication with other communication devices (for example, the base station 100 and another terminal device 200). In addition, the wireless communication used by the terminal device 200 may be wireless communication using a millimeter wave or a terahertz wave. It is noted that the wireless communication (including sidelink communication) used by the terminal device 200 may be wireless communication using radio waves or wireless communication (optical wireless) using infrared rays or visible light.

In the communication system 1 described above, all the plurality of master UEs 200M have a function of representing the group 12 and communicate with the base station 100, but the present disclosure is not limited thereto. For example, the plurality of master UEs 200M may be provided with a priority (hierarchy) for communicating with the base station 100. For example, among the plurality of master UEs 200M, some of the master UEs 200M may communicate with the base station 100 according to the priority.

Figure 3:
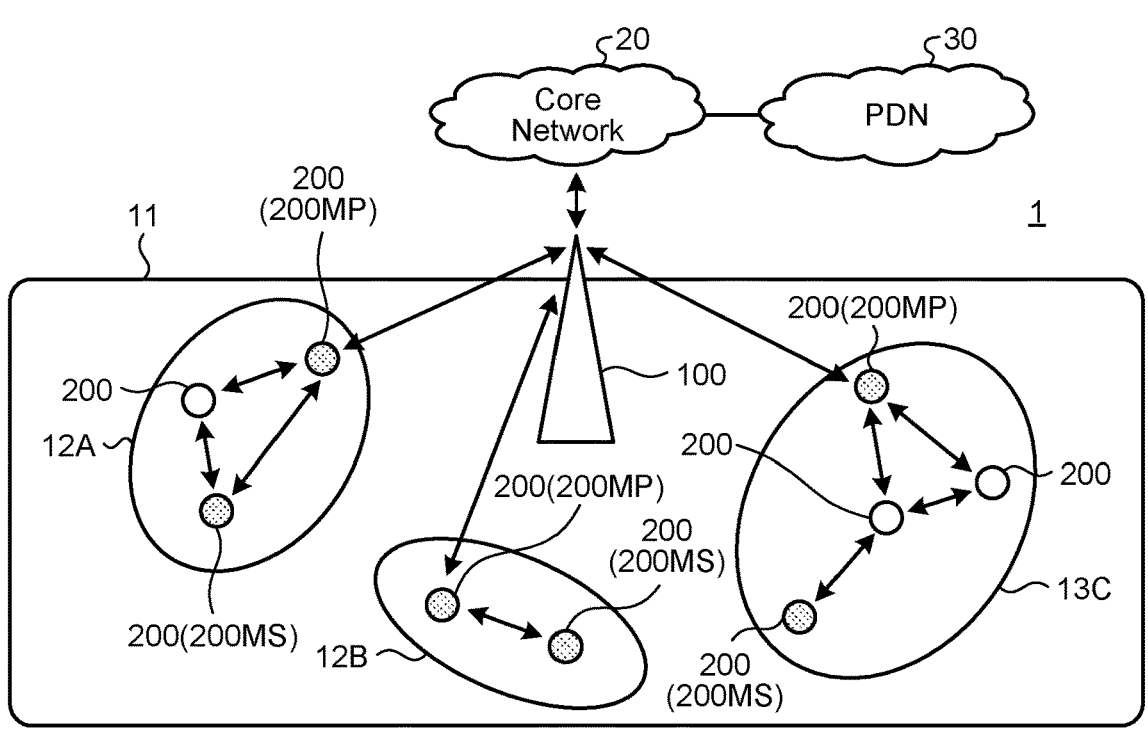
FIG. 3 is a diagram illustrating another example of the schematic configuration of the communication system according to the embodiment of the present disclosure.

FIG. 3 is a diagram illustrating another example of the schematic configuration of the communication system 1 according to the embodiment of the present disclosure. In the example of FIG. 3, a plurality of master UEs 200M include a primary master UE 200MP having the highest priority (a primary master UE. Hereinafter, the same is also referred to as pm UE 200MP), and a secondary master UE 200MS having a low priority (secondary master UE. Hereinafter, the same is also referred to as an sm UE 200MS).

The pm UE 200MP (an example of a first master device) communicates with the base station 100 as a representative of the plurality of master UEs 200M. The sm UE 200MS (an example of a second master device) communicates with the base station 100 instead of the pm UE 200MP according to the communication state between the pm UE 200MP and the base station 100, for example, when communication between the pm UE 200MP and the base station 100 is interrupted. For example, while the pm UE 200MP is communicating with the base station 100, the sm UE 200MS performs sidelink communication similarly to another terminal device 200 belonging to the group 12.

In FIG. 3, the terminal device 200 belonging to the group 12 performs sidelink communication with both the pm UE 200MP and the sm UE 200MS. However, the master UE 200M with which the terminal device 200 performs sidelink communication may be the sm UE 200MS. Such a case will be described with reference to FIG. 4.

Figure 4:
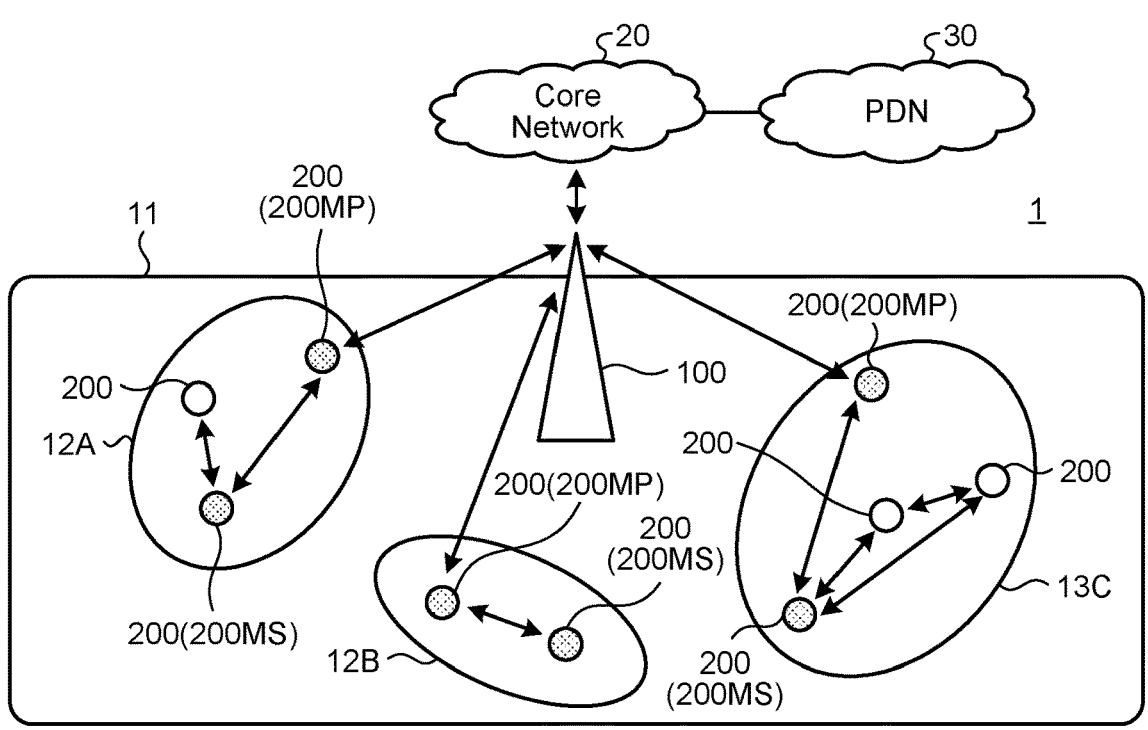
FIG. 4 is a diagram illustrating another example of the schematic configuration of the communication system according to the embodiment of the present disclosure.

FIG. 4 is a diagram illustrating another example of the schematic configuration of the communication system 1 according to the embodiment of the present disclosure. Hereinafter, a group 13C will be described, but the same applies to the other groups 12. As illustrated in FIG. 4, the pm UE 200MP communicates with the base station 100. In addition, the pm UE 200MP performs sidelink communication with the sm UE 200MS and does not perform communication with another terminal device 200. The sm UE 200MS performs sidelink communication with the pm UE 200MP and another terminal device 200.

In the communication system 1 illustrated in FIG. 4, devices that connect the base station 100, the pm UE 200MP, the sm UE 200MS, and another terminal device 200 in this order have a hierarchical structure, thereby making it possible to reduce the processing load of the pm UE 200MP and the sm UE 200MS.

It is noted that FIGS. 3 and 4 illustrate a case where one pm UE 200MP and one sm UE 200MS are set for each of the groups 12A to 12C, but the number of sm UEs 200MS is not limited thereto. For example, two or more sm UEs 200MS may be set.

When two or more sm UEs 200MS are set, priority (hierarchy) may be set for two or more sm UEs 200MS. In addition, as illustrated in FIG. 4, when the sm UE 200MS and the terminal device 200 perform sidelink communication, the terminal device 200 to be connected may be divided for each of the plurality of sm UEs 200MS. That is, a subgroup may be formed for each of the plurality of sm UEs 200MS, and each sm UE 200MS may perform sidelink communication with the terminal device 200 included in the corresponding subgroup.

It is noted that details of the functions, determination methods, and the like of the pm UE 200MP and the sm UE 200MS will be described later.

In addition, in the following description, in order to simplify the description, it is assumed that all of the plurality of master UEs 200M perform duplication communication or multiplication communication with the base station 100 unless otherwise specified.

<2.2. Configuration of Base Station>

Figure 5:
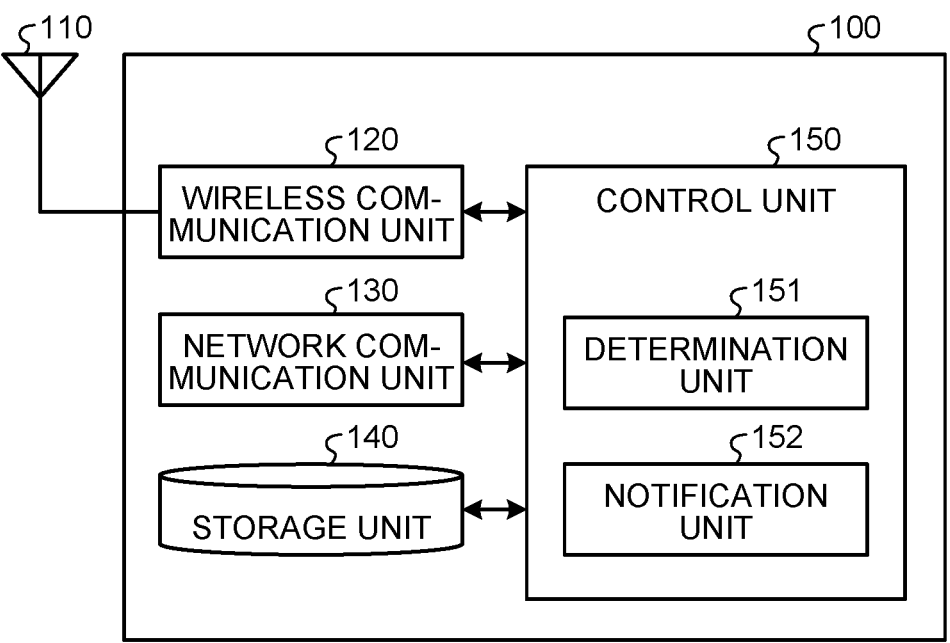
FIG. 5 is a block diagram illustrating an example of a configuration of a base station according to the embodiment of the present disclosure.

FIG. 5 is a block diagram illustrating an example of a configuration of the base station 100 according to the embodiment of the present disclosure. Referring to FIG. 5, the base station 100 includes an antenna unit 110, a wireless communication unit 120, a network communication unit 130, a storage unit 140, and a control unit 150.

(1) Antenna Unit 110

The antenna unit 110 radiates a signal output from the wireless communication unit 120 into space as a radio wave. Furthermore, the antenna unit 110 converts the radio wave in space into a signal and outputs the signal to the wireless communication unit 120. It is noted that the antenna unit 110 of the present embodiment includes a plurality of antenna elements and can form a beam.

(2) Wireless Communication Unit 120

The wireless communication unit 120 transmits and receives a signal. For example, the wireless communication unit 120 transmits a downlink signal to the terminal device 200 and receives an uplink signal from the terminal device 200. It is noted that the wireless communication unit 120 of the present embodiment can communicate with the terminal device 200 by forming a plurality of beams by the antenna unit 110.

(3) Network Communication Unit 130

The network communication unit 130 transmits and receives information. For example, the network communication unit 130 transmits information to another node and receives information from another node. For example, the other node includes another base station 100 and a core network node.

(4) Storage Unit 140

The storage unit 140 temporarily or permanently stores programs and various data for the operation of the base station 100.

(5) Control unit 150

The control unit 150 controls the operation of the entire base station 100 and provides various functions of the base station 100. The control unit 150 includes a determination unit 151 and a notification unit 152.

(5-1) Determination Unit 151

For example, when the base station 100 determines the plurality of master UEs 200M, the determination unit 151 determines the plurality of master UEs 200M based on information acquired from the terminal device 200. The information acquired by the determination unit 151 from the terminal device 200 is determination information for determining the plurality of master UEs 200M. Details of the determination information will be described later.

Furthermore, for example, in a case where the terminal device 200 determines the plurality of master UEs 200M, the determination unit 151 determines information to be transmitted to the terminal device 200. Such information is determination information used by the terminal device 200 to determine the plurality of master UEs 200M. Details of the determination information will be described later.

(5-2) Notification Unit 152

The notification unit 152 notifies the terminal device 200 of a determination result of the determination unit 151. For example, when the base station 100 determines the plurality of master UEs 200M, the notification unit 152 notifies the plurality of master UEs 200M determined by the determination unit 151 of the fact that the same are determined as the master UEs 200M.

In addition, in a case where the terminal device 200 determines the plurality of master UEs 200M, the notification unit 152 notifies the terminal device 200 of the determination information determined by the determination unit 151.

The control unit 150 may further include other components other than these components. That is, the control unit 150 can also perform operations other than the operations of these components.

<2.3. Configuration of Terminal Device>

Figure 6:
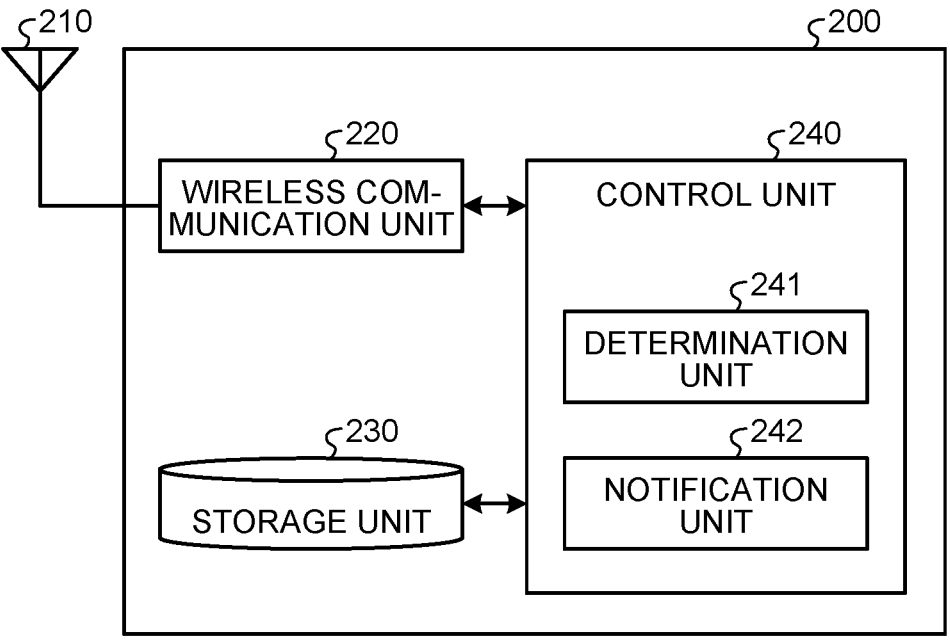
FIG. 6 is a block diagram illustrating an example of a configuration of a terminal device according to the embodiment of the present disclosure.

FIG. 6 is a block diagram illustrating an example of a configuration of the terminal device 200 according to the embodiment of the present disclosure. Referring to FIG. 6, the terminal device 200 includes an antenna unit 210, a wireless communication unit 220, a storage unit 230, and a control unit 240.

(1) Antenna Unit 210

The antenna unit 210 radiates a signal output from the wireless communication unit 220 into space as a radio wave. Furthermore, the antenna unit 210 converts the radio wave in space into a signal and outputs the signal to the wireless communication unit 220. It is noted that the antenna unit 210 of the present embodiment includes a plurality of antenna elements and can form a beam.

(2) Wireless Communication Unit 220

The wireless communication unit 220 transmits and receives a signal. For example, the wireless communication unit 220 receives a downlink signal from the base station 100 and transmits an uplink signal to the base station 100. It is noted that the wireless communication unit 220 of the present embodiment can communicate with the base station 100 by forming a plurality of beams by the antenna unit 210.

(3) Storage Unit 230

The storage unit 230 temporarily or permanently stores programs and various data for the operation of the terminal device 200.

(4) Control Unit 240

The control unit 240 controls the operation of the entire terminal device 200 and provides various functions of the terminal device 200. The control unit 240 includes a determination unit 241, a judgement unit 242, and a notification unit 243.

(4-1) Determination Unit 241

For example, the determination unit 241 determines information to be transmitted to another terminal device 200 or the base station 100. Such information is determination information used by another terminal device 200 or the base station 100 to determine the plurality of master UEs 200M. Details of the determination information will be described later.

(4-2) Judgement Unit 242

Furthermore, for example, in a case where the terminal device 200 determines a plurality of master UEs 200M, the judgement unit 242 judges whether or not the own device is one of the plurality of master UEs 200M based on information acquired from another terminal device 200 or the base station 100. The information acquired by the judgement unit 242 from another terminal device 200 or the base station 100 is determination information for determining the plurality of master UEs 200M. Details of the determination information will be described later.

(4-3) Notification Unit 243

The notification unit 243 notifies another terminal device 200 or the base station 100 of the determination information determined by the determination unit 241. In addition, in a case where the judgement unit 242 judges that the own device is one of the plurality of master UEs 200M, the notification unit 243 notifies the base station 100 of a judgement result.

The control unit 240 may further include other components other than these components. That is, the control unit 240 can also perform operations other than the operations of these components.

3. Method of Determining Plurality of Master UEs

Next, a method of determining a plurality of master UEs 200M will be described. As described above, methods of determining the plurality of master UEs 200M include a method in which a plurality of terminal devices 200 belonging to the group 12 autonomously determine the plurality of master UEs 200M and a method in which a device other than the group 12 (for example, the base station 100) determines the plurality of master UEs 200M.

<3.1. Determination Method by Terminal Device>

First, a description will be given as to a method in which the plurality of terminal devices 200 belonging to the group 12 autonomously determine the plurality of master UEs 200M. In this case, the terminal device 200 acquires determination information for determining the plurality of master UEs 200M (an example of the master device). The terminal device 200 determines whether or not the own device is one of the plurality of master UEs 200M based on the acquired determination information. For example, the determination information is acquired from the terminal device 200, another terminal device 200, or the base station 100.

(1) Determination Information

First, an example of the determination information will be described. The determination information may include the following information.

Received power information

Position information

Capability information

Coverage information

Assistance information from base station

The terminal device 200 acquires at least one of the above-described information from another terminal device 200 or the base station 100, and judges whether or not the own device is the master UE 200M based on the acquired information.

(1-1) Received Power

The determination information includes information on received power of a signal received from the base station 100. Examples of the received power include the following power specified in TS38.215.

RSRP (Reference Signal Received Power)

RSRQ (Reference Signal Received Quality)

RSSI (Received Signal Strength Indicator)

SIR (Signal to Interference Ratio)

The terminal device 200 transmits the information on the received power of the own device to another terminal device 200 belonging to the same group 12 as the own device, and acquires the information on the received power from the other terminal device 200.

The terminal device 200 compares the acquired received power with the received power of the own device, and judges that the own device is one of the plurality of master UEs 200M when the received power of the own device is included within the n-th largest received power.

As a result, the communication system 1 can determine the n terminal devices 200 having high received power as the master UE 200M from the plurality of terminal devices 200 included in the group 12.

Alternatively, for example, when the pm UE 200MP and the sm UE 200MS are set as the plurality of master UEs 200M, the terminal device 200 having the highest received power may be determined as the pm UE 200MP, and the terminal device 200 having the low received power may be determined as the sm UE 200MS. For example, when the surrounding environment changes and the received power between the pm UE 200MP and the base station 100 decreases, there is a possibility that the received power of the sm UE 200MS having the low received power until then increases.

Therefore, in addition to the terminal device 200 having high received power, the terminal device 200 having low received power also functions as the plurality of master UEs 200M, thereby making it possible to construct the communication system 1 that can cope with a change in communication situation. Accordingly, it is possible to further improve low delay and high reliability of the communication system 1.

(1-2) Position Information

The determination information includes position information of the terminal device 200. Examples of the position information of the terminal device 200 include the following information.

Information indicating a relative positional relationship with the base station 100

Information indicating a relative positional relationship of the terminal devices 200 in the group 12

Information indicating an absolute position of the terminal device 200

(Relative Position with Base Station)

As a relative positional relationship with the base station 100, for example, there is a distance between the base station 100 and the terminal device 200. The terminal device 200 transmits information on a distance between the own device and the base station 100 to another terminal device 200 belonging to the same group 12 as the own device, and acquires, from the other terminal device 200, information on the distance between the base station 100 and the other terminal device 200.

The terminal device 200 compares the acquired distance with the distance of the own device, and judges that the own device is one of the plurality of master UEs 200M when the distance of the own device is included within the n-th distance from the shortest distance.

As a result, the communication system 1 can determine, as the master UE 200M, the n terminal devices 200 having a short distance from the base station 100 from among the plurality of terminal devices 200 included in the group 12.

Alternatively, the terminal device 200 may compare the acquired distance with the distance of the own device, and judge that the own device is one of the plurality of master UEs 200M when the distance of the own device is within the n1-th distance from the shortest distance or within the n2-th distance from the longest distance.

As a result, the communication system 1 can determine, from among the plurality of terminal devices 200 included in the group 12, the n1 terminal devices 200 having a short distance from the base station 100 and the n2 terminal devices 200 having a long distance from the base station 100 as the master UE 200M.

Furthermore, examples of the relative positional relationship with the base station 100 include a direction viewed from the base station 100.

For example, when the own device is the rightmost terminal device 200 or the leftmost terminal device 200 as viewed from the base station 100 within the area of the group 12, the terminal device 200 judges that the own device is one of the plurality of master UEs 200M.

Furthermore, as the information indicating the direction viewed from the base station 100, for example, there is information on a beam transmitted by the base station 100.

Here, in 5G, beamforming is performed by the base station 100. The base station 100 forms a plurality of beams and transmits a signal. Information (beam ID) for identifying a beam is allocated to the beam.

The terminal device 200 transmits information on the beam ID to another terminal device 200 belonging to the same group 12 as the own device, for example, and acquires the information on the beam ID from the other terminal device 200.

The terminal device 200 compares the acquired beam ID with the beam ID of the own device, and judges that the own device is one of the plurality of master UEs 200M when the beam ID of the own device is the largest or the smallest. Alternatively, when the acquired beam ID or the beam ID of the own device is a predetermined value (for example, zero), the terminal device 200 judges that the device corresponding to the beam ID is one of the plurality of master UEs 200M.

Alternatively, the terminal device 200 may judge whether or not the own device is one of the plurality of master UEs 200M using a function or the like shared in the group 12. Such a function can be, for example, a function for determining, as the plurality of master UEs 200M, the terminal device 200, the own device of which is located at the rightmost end or the leftmost end as viewed from the base station 100, within the area of the group 12.

As a result, the terminal device 200 can select a plurality of terminal devices 200 separated in the direction viewed from the base station 100 as the plurality of master UEs 200M.

(Relative Position of Terminal Device)

In the method using the position information described above, the plurality of master UEs 200M are determined according to the positional relationship between the base station 100 and the terminal device 200, but the present disclosure is not limited thereto. For example, the terminal device 200 may determine the plurality of master UEs 200M from the positional relationship of the plurality of terminal devices 200 regardless of the positional relationship with the base station 100.

For example, a zone that divides the area of the group 12 into predetermined areas is set, and identification information (zone ID) is set for each zone. The terminal device 200 transmits, for example, the zone ID of a zone in which the own device is positioned to another terminal device 200 as the determination information.

For example, the terminal device 200 judges whether or not the own device is one of the plurality of master UEs 200M using a function or the like shared in the group 12. Such a function is assumed to be, for example, a function configured so that the terminal devices 200 positioned in different zones are selected as the plurality of master UEs 200M.

Alternatively, for example, when a plurality of terminal devices 200 are installed in a vehicle and perform intravehicle communication, each of the terminal devices 200 may be installed at a predetermined place such as a side mirror or a windshield. As described above, in a case where the installation places of the plurality of terminal devices 200 are known in advance, the plurality of master UEs 200M may be determined according to the installation places of the plurality of terminal devices 200.

As a result, the terminal device 200 can select a plurality of terminal devices 200 separated from each other in the group 12 as a plurality of master UEs 200M.

(Absolute Position of Terminal Device)

The terminal device 200 may determine a plurality of master UEs 200M from absolute position information of the plurality of terminal devices 200 regardless of relative position information.

Examples of the absolute position information include position information acquired by a global positioning system (GPS). Alternatively, the terminal device 200 acquires position information of the own device by measuring a positioning reference signal transmitted from the base station 100 of LTE or NR.

The terminal device 200 transmits the acquired position information to another terminal device 200. The terminal device 200 judges whether or not the own device is one of the plurality of master UEs 200M based on the position information of the own device and the position information of another terminal device 200. Such judgement is similar to the judgement using the relative position information. For example, when the absolute position information of the base station 100 is known, the plurality of master UEs 200M can be selected according to a distance between the base station 100 and the terminal device 200 based on the position information of the base station 100 and the position information of the terminal device 200. In addition, the plurality of master UEs 200M can be selected according to the direction viewed from the base station 100 and the positional relationship among the plurality of terminal devices 200.

As described above, the communication system 1 can select the plurality of master UEs 200M even with the absolute position information of the terminal device 200, similarly to the relative position information.

(1-3) Capability Information

The above-described determination information includes capability information of the terminal device 200. The capability information may include at least one of the following pieces of information.

Maximum transmission power (power class)

Capability related to transmission and reception of sidelink communication

Transmission/reception capability in Uu link

First, the capability information of the terminal device 200 may include information related to the maximum transmission power (power class) of the terminal device 200. For example, the terminal device 200, the maximum transmission power of which is equal to or greater than a predetermined threshold value, is selected as one of the plurality of master UEs 200M.

In addition, the capability information of the terminal device 200 may include capability information on the transmission and reception of sidelink communication. More specifically, the capability information may include information indicating whether or not transmission or reception in a channel (for example, PSCCH, PSSCH, PSFCH, and the like) in predetermined sidelink communication can be performed. For example, the terminal device 200 capable of performing transmission or reception in a channel in predetermined sidelink communication is selected as one of the plurality of master UEs 200M.

The capability information of the terminal device 200 may include capability information of transmission and reception in the Uu link. That is, the capability information of the terminal device 200 may include information indicating whether or not transmission or reception in at least one of the downlink and the uplink with the base station 100 can be performed. For example, the terminal device 200 capable of performing the transmission or reception in the Uu link is selected as one of the plurality of master UEs 200M.

(1-4) Coverage Information

The determination information includes information (coverage information) indicating whether or not the terminal device 200 is within the coverage of the base station 100. For example, at least the terminal device 200 within the coverage of the base station 100 is selected as one of the plurality of master UEs 200M.

More specifically, the terminal device 200 measures received power of a reference signal transmitted from the base station 100, and transmits a measurement result as coverage information to another terminal device 200. When at least the measurement result of the own device is equal to or greater than a predetermined threshold value, the terminal device 200 can be judged as one of the plurality of master UEs 200M. In other words, the terminal device 200 in which at least the received power of the reference signal is equal to or greater than a predetermined threshold value is selected as one of the plurality of master UEs 200M.

Alternatively, the terminal device 200 transmits the received power of the reference signal transmitted from the own device to the base station 100 at the base station 100 to another terminal device 200 as coverage information. When at least the measurement result in the base station 100 is equal to or greater than the predetermined threshold value, the terminal device 200 is determined as one of the plurality of master UEs 200M. In other words, the terminal device 200 in which at least the received power of the reference signal at the base station 100 is equal to or greater than the predetermined threshold value is selected as one of the plurality of master UEs 200M.

(1-5) Assistance Information from Base Station

The above-described determination information is information transmitted from the terminal device 200 to another terminal device 200, but the present disclosure is not limited thereto. For example, the determination information may include assistance information transmitted from the base station 100 to the plurality of terminal devices 200. The assistance information includes at least one of information acquired by the base station 100 from each terminal device 200 and information determined based on the information.

The base station 100 acquires, for example, at least one of the received power information, the position information, and the capability information described above from the terminal device 200. The terminal device 200 transmits at least one of the received power information, the position information, and the capability information to the base station 100 instead of transmitting the information to another terminal device 200. The base station 100 transmits at least one of the acquired received power information, position information, and capability information to the terminal device 200.

Further, the base station 100 may transmit a list of the plurality of terminal devices 200 belonging to the group 12 to the terminal device 200 as the determination information.

The terminal device 200 that has acquired these pieces of information determines whether or not the own device is one of the plurality of master UEs 200M based on the acquired information.

Alternatively, the base station 100 may determine the terminal devices 200 recommended as the plurality of master UEs 200M (hereinafter, the same are also referred to as a plurality of master candidate terminals) based on the information acquired from the terminal device 200. The base station 100 can determine a plurality of master candidate terminals in the same manner as the terminal device 200 determines whether or not the own device is the master UE 200M. In this case, the base station 100 notifies the terminal device 200 of information on the plurality of determined master candidate terminals as candidate information.

In this case, when the own device is included in the plurality of master candidate terminals, the terminal device 200 determines that the own device is one of the plurality of master UEs 200M.

Furthermore, the base station 100 may determine the terminal device 200 that is not recommended as the plurality of master UEs 200M (hereinafter, the same is also referred to as an excluded candidate terminal) based on the information acquired from the terminal device 200. For example, the base station 100 can determine the terminal device 200, the received power of which is equal to or less than a threshold value, as an excluded candidate based on the received power information. Alternatively, the base station 100 may determine the excluded candidate terminal based on the capability information, such as determining the terminal device 200, the maximum transmission power of which is equal to or less than a threshold value, as an excluded candidate terminal.

In this case, the base station 100 notifies the terminal device 200 of information on the determined excluded candidate terminal as exclusion information. When the own device is included in the excluded candidate terminal, the terminal device 200 judges that the own device is not one of the plurality of master UEs 200M.

(2) Flow of Determination Processing

Next, a description will be given as to a flow of determination processing of the plurality of master UEs 200M in the communication system 1. As described above, in the communication system 1, the terminal device 200 acquires the determination information, and judges whether or not the own device is one of the plurality of master UEs 200M based on the acquired determination information and the predetermined reference.

As described above, the terminal device 200 notifies another terminal device 200 or the base station 100 of the determination information on the own device. Furthermore, the determination information can include the various types of information described above, but in the following description, in order to simplify the description, it is assumed that the terminal device 200 notifies another terminal device 200 of information on the received power as the determination information.

Figure 7:
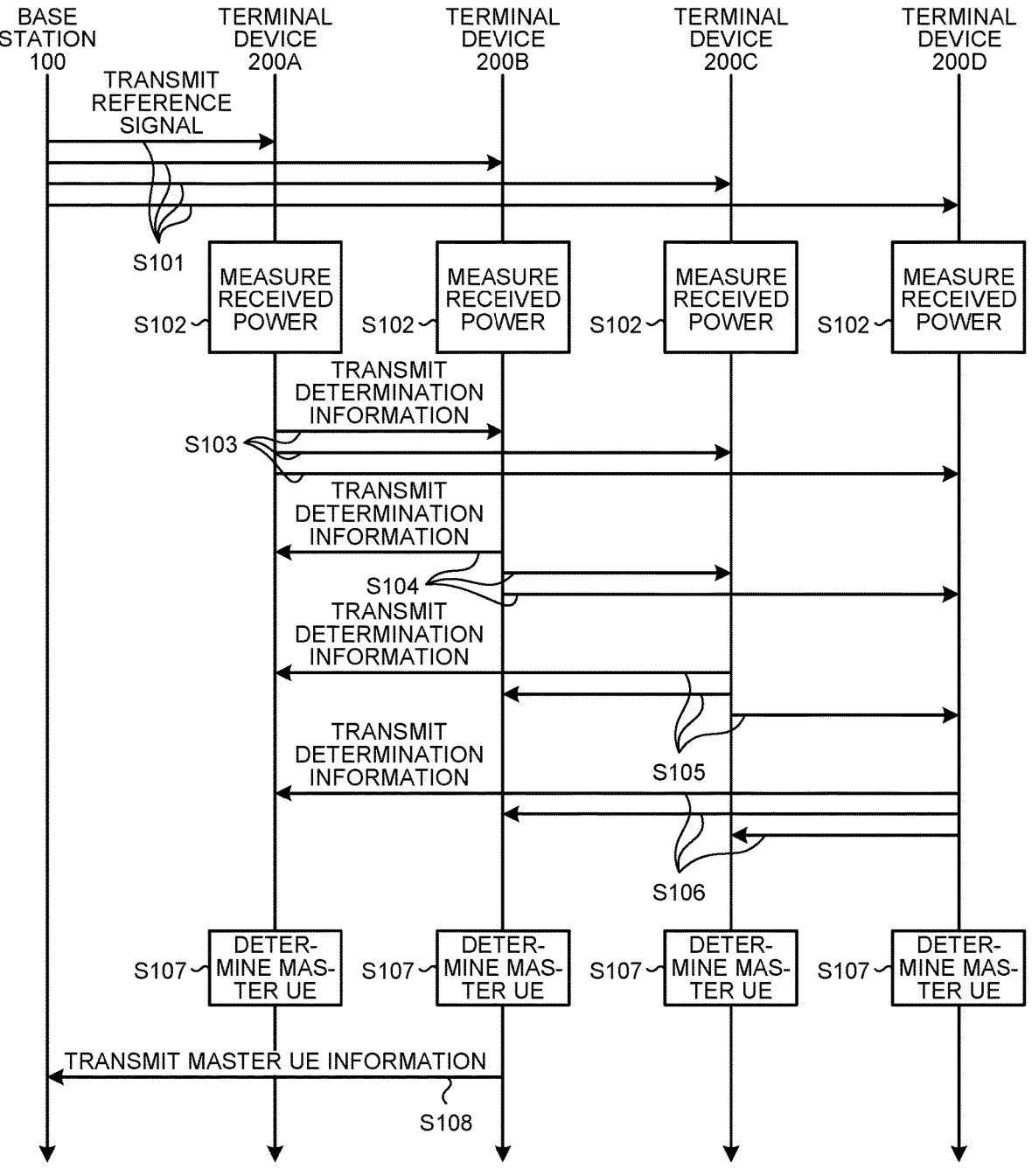
FIG. 7 is a sequence diagram illustrating an example of a flow of determination processing according to the embodiment of the present disclosure.

FIG. 7 is a sequence diagram illustrating an example of a flow of determination processing according to the embodiment of the present disclosure. In FIG. 7, the plurality of terminal devices 200 belonging to the group 12 are referred to as terminal devices 200A to 200D in order to distinguish the devices.

As illustrated in FIG. 7, the base station 100 first transmits a reference signal to the terminal devices 200A to 200D (Step S101). It is noted that the reference signal transmitted by the base station 100 is a signal to allow the terminal device 200 to measure received power, and for example, a channel state information-reference signal (CSI-RS) is used for the signal. For example, the CSI-RS is reported to all the terminal devices 200 in the group 12.

The terminal devices 200A to 200D measure the received power of the reference signal (Step S102). The terminal device 200A notifies the terminal devices 200B to 200D of a measurement result as the determination information by groupcast transmission (Step S103).

Similarly, the terminal device 200B notifies the terminal devices 200A, 200C, and 200D of a measurement result as the determination information by groupcast transmission (Step S104). The terminal device 200C notifies the terminal devices 200A, 200B, and 200D of a measurement result as the determination information by groupcast transmission (Step S105). The terminal device 200D notifies the terminal devices 200A to 200C of a measurement result as determination information by groupcast transmission (Step S106).

The terminal device 200 transmits the determination information using, for example, at least one of the PSCCH and the PSSCH. It is noted that the determination information may be information of a physical layer or information of an upper layer (MAC, RRC, or the like).

Furthermore, in a case where the terminal devices 200A to 200D can simultaneously perform transmission and reception of sidelink communication, some or all of the terminal devices 200A to 200D may simultaneously transmit the determination information. That is, the terminal devices 200A to 200D may simultaneously perform the processing of Steps S103 to S106.

On the other hand, in a case where the terminal devices 200A to 200D cannot simultaneously perform transmission and reception of the sidelink communication, in other words, perform either one of transmission and reception, the terminal devices 200A to 200D respectively transmit the determination information at different timings, as illustrated in FIG. 7. It is noted that the transmission timing (transmission order) of the determination information by each of the terminal devices 200A to 200D is determined based on an identification number or the like allocated to each of the terminal devices 200A to 200D in advance.

The terminal devices 200A to 200D judge whether or not the own device is one of the plurality of master UEs 200M based on the received determination information (Step S107). For example, in a case where the received power of the own device is within the second largest one, the terminal device 200 judges that the own device is one of the plurality of master UEs 200M. Here, for example, it is assumed that each of the terminal devices 200A and 200B is determined as one of the plurality of master UEs 200M.

One of the terminal devices 200A and 200B (the terminal device 200B in FIG. 7) determined as one of the plurality of master UEs 200M notifies the base station 100 of information on the plurality of master UEs 200M as master UE information (Step S108).

The terminal device 200B transmits the master UE information using, for example, an uplink channel such as at least one of the PUSCH and the PUSCH. Alternatively, the terminal device 200B may transmit the master UE information using, for example, a sidelink channel such as at least one of the PUSCH and the PSSCH.

It is noted that, here, one of the terminal devices 200A and 200B determined as one of the plurality of master UEs 200M notifies the base station 100 of the information on the plurality of master UEs 200M as the master UE information, but the present disclosure is not limited thereto. Each of the terminal devices 200A and 200B determined as one of the plurality of master UEs 200M may notify the base station 100 of the information on the plurality of master UEs 200M as the master UE information.

In this manner, the terminal device 200 shares the determination information for determining the plurality of master UEs 200M in the group 12, and determines the plurality of master UEs 200M based on the reference shared in advance. As a result, the terminal device 200 can determine the plurality of master UEs 200M.

Here, the number of the terminal devices 200 belonging to the group 12 is set to four, and the plurality of master UEs 200M are set to two, but the present disclosure is not limited thereto. The number of terminal devices 200 belonging to the group 12 may be two or more, and may be three or four or more. In addition, the plurality of master UEs 200M may be three or more.

(3) Reselection of Master UE

The terminal device 200 performs reselection of the master UE 200M when a reselection trigger is applied. In this reselection, reselection of at least one master UE 200M among the plurality of master UEs 200M can be performed. That is, not all the master UEs 200M need to be reselected by this reselection.

In addition, for example, at least one of the base station 100 and the plurality of master UEs 200M transmits the reselection trigger to the terminal devices 200 belonging to the group 12. Among the plurality of master UEs 200M, for example, the master UE 200M satisfying a predetermined condition may transmit the reselection trigger. Alternatively, the master UE 200M having a high priority (hierarchy) such as the pm UE 200MP may transmit the reselection trigger. It is noted that, in the following description, in order to simplify the description, it is assumed that one of the plurality of master UEs 200M transmits the reselection trigger (performs selection).

Examples of a condition for transmitting the reselection trigger (hereinafter, also referred to as a trigger condition) include the following.

Time

Received power

Position information

Coverage information (Time)

An example of the trigger condition includes time. For example, the master UE 200M executes reselection by transmitting a reselection trigger every elapse of a predetermined time (for example, X milliseconds). The predetermined time X may be randomly set, for example, or may be designated by the base station 100.

(Received Power)

An example of the trigger condition includes received power with the base station 100. For example, the master UE 200M performs reselection in a case where the received power with the base station 100 becomes equal to or less than a predetermined threshold value.

(Position Information)

An example of the trigger condition includes a positional relationship of the terminal device 200. For example, the master UE 00M performs reselection in a case where spatial correlation with another terminal device 200 becomes close and becomes equal to or less than a predetermined threshold value. For example, the master UE 200M performs reselection in a case where a distance to another terminal device 200 becomes equal to or less than a predetermined threshold value.

(Coverage Information)

An example of the trigger condition includes whether or not the master UE 200M is within the coverage range of the base station 100. For example, the master UE 200M executes reselection in a case where the same is out of the coverage of the base station 100.

The terminal device 200 that has received the reselection trigger from the master UE 200M shares the determination information and judges whether or not the own device is one of the plurality of master UEs 200M, thereby executing reselection, in the same manner as that of the method of determining the master UE 200M described above.

In addition to the conditions described above, the reselection trigger can be transmitted depending on whether or not the same information as the determination information used for selecting the plurality of master UEs 200M satisfies a predetermined condition.

<3.2. Determination Method by Base Station>

Next, a description will be given as to a method in which the base station 100 determines a plurality of master UEs 200M. In this case, the base station 100 sets the plurality of master UEs 200M of the group 12 to be set at the timing of setting the plurality of terminal devices 200 into one group 12.

For example, the base station 100 acquires determination information from the plurality of terminal devices 200 in the group 12, and determines the plurality of master UEs 200M based on the acquired determination information. It is noted that the determination information and the method of determining the plurality of master UEs 200M are the same as those in the case where the terminal device 200 determines the plurality of master UEs 200M.

The base station 100 notifies the terminal devices 200 in the group 12 of master UE information on the determined plurality of master UEs 200M. At this time, the base station 100 may notify all the terminal devices 200 in the group 12 of the master UE information, or may notify the terminal device 200 determined as the master UE 200M of the master UE information.

It is noted that the base station 100 sets, for example, the terminal device 200 determined through RRC (upper layer) signaling as the master UE 200M.

Next, a description will be given as to a flow of determination processing of the plurality of master UEs 200M in the communication system 1. Here, the base station 100 acquires determination information, and determines a plurality of master UEs 200M based on the acquired determination information and a predetermined reference. The base station 100 provides notification of information on the determined plurality of master UEs 200M.

Figure 8:
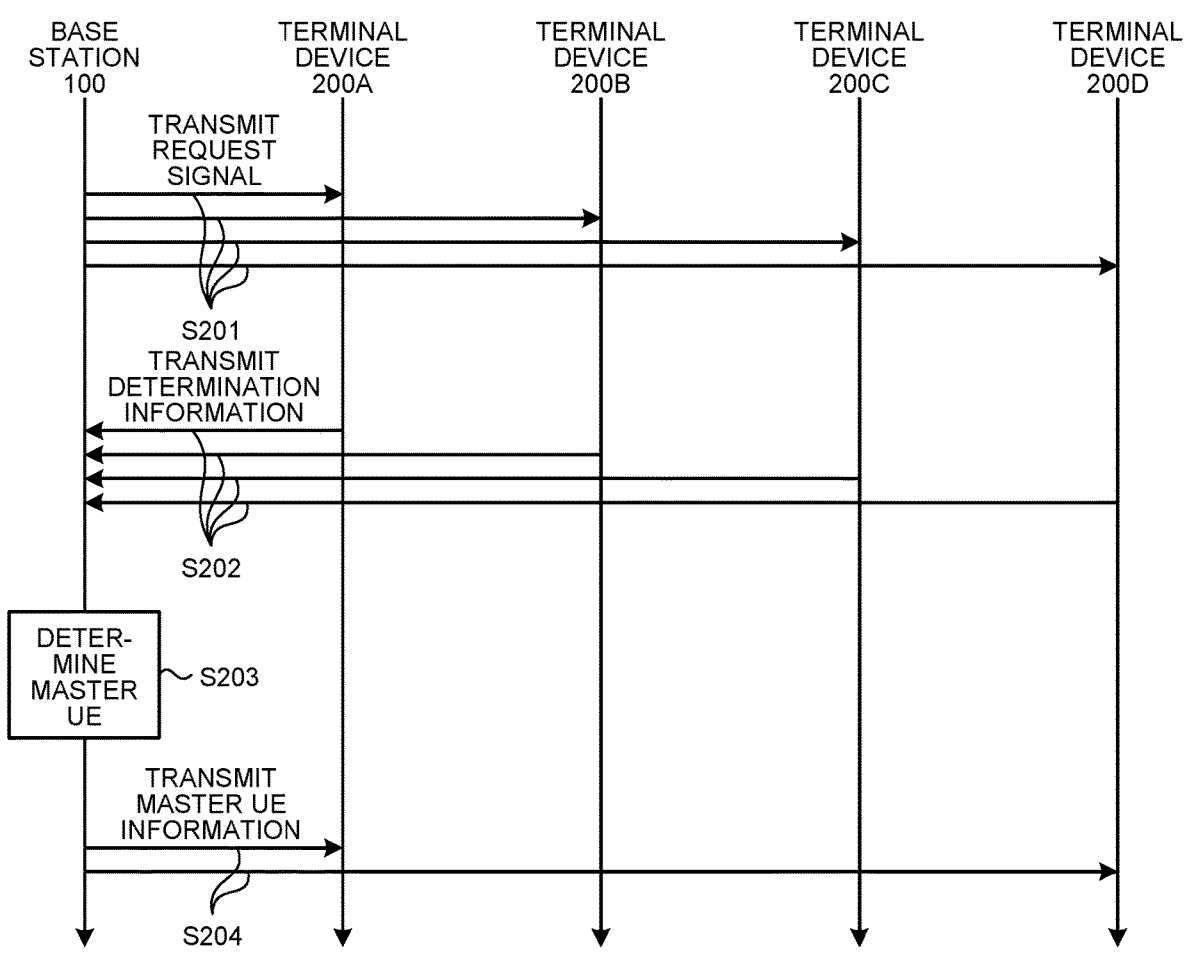
FIG. 8 is a sequence diagram illustrating another example of the flow of the determination processing according to the embodiment of the present disclosure.

FIG. 8 is a sequence diagram illustrating another example of the flow of the determination processing according to the embodiment of the present disclosure. In FIG. 8, the plurality of terminal devices 200 belonging to the group 12 are referred to as terminal devices 200A to 200D in order to distinguish the devices.

As illustrated in FIG. 8, the base station 100 first transmits a request signal for requesting the terminal devices 200A to 200D to transmit determination information (Step S201). The request signal is transmitted using, for example, a downlink channel such as at least one of the PDCCH and the PDSCH. Alternatively, the request signal may be transmitted using a sidelink link channel such as at least one of the PSCCH and the PSSCH. FIG. 8 illustrates, as an example, a case where notification of the request signal is provided by Groupcast transmission in sidelink communication.

The terminal devices 200A to 200D transmit the determination information to the base station 100 in response to the request signal (Step S202). The terminal devices 200A to 200D transmit the determination information to the base station 100, for example, at a transmission timing included in the request signal.

The determination information is transmitted using, for example, an uplink channel such as at least one of the PUCCH and the PUSCH. Alternatively, the determination information may be transmitted using a sidelink link channel such as at least one of the PSCCH and the PSSCH. It is noted that the determination information may be information of a physical layer or information of an upper layer (MAC, RRC, or the like).

In addition, the terminal devices 200A to 200D may simultaneously transmit the determination information. In this case, the terminal devices 200A to 200D perform frequency division multiplexing or code division multiplexing using at least one of different frequency resources and different code resources, thereby transmitting the determination information.

Alternatively, the terminal devices 200A to 200D may transmit the determination information at different timings. In this case, the transmission timing (transmission order) of the determination information by each of the terminal devices 200A to 200D may be transmitted according to the timing included in the request signal as described above. Alternatively, the transmission timing may be determined based on an identification number or the like allocated in advance to each of the terminal devices 200A to 200D.

The base station 100 determines a plurality of master UEs 200M based on the acquired determination information (Step S203). Here, it is assumed that the base station 100 determines the terminal devices 200A and 200D as the plurality of master UEs 200M.

The base station 100 transmits master UE information on the determined plurality of master UEs 200M to the terminal devices 200A and 200D (Step S204). FIG. 8 illustrates a case where the base station 100 individually notifies the terminal devices 200A and 200D of the master UE information by Unicast transmission. In addition thereto, the base station 100 may notify all the terminal devices 200A to 200D of the master UE information by Groupcast transmission.

It is noted that the master UE information is transmitted using, for example, a downlink channel such as at least one of the PDCCH and the PDSCH. Alternatively, the master UE information may be transmitted using a sidelink channel such as at least one of the PDCCH and the PSSCH.

As described above, the base station 100 acquires the determination information for determining the plurality of master UEs 200M from the terminal devices 200 in the group 12 and determines the plurality of master UEs 200M. As a result, the base station 100 can determine the plurality of master UEs 200M.

Here, the number of the terminal devices 200 belonging to the group 12 is set to four, and the plurality of master UEs 200M are set to two, but the present disclosure is not limited thereto. The number of terminal devices 200 belonging to the group 12 may be two or more, and may be three or four or more. In addition, the plurality of master UEs 200M may be three or more.

Next, a description will be given as to reselection of the plurality of master UEs 200M. The base station 100 and the terminal device 200 executes reselection of the plurality of master UEs 200M according to a reselection trigger. A trigger condition for executing reselection may be the same as the trigger condition described above.

In addition, the transmission of the reselection trigger may be performed by the base station 100 or may be performed by the plurality of master UEs 200M. In addition, the plurality of master UEs 200M may transmit a reselection request to the base station 100, and the base station 100 may transmit a reselection trigger. In a case where the base station 100 transmits the reselection trigger, when receiving the reselection trigger, the plurality of master UEs 200M transfer the received reselection trigger to the terminal devices 200 in the group 12.

The reselection request may be transmitted by the terminal device 200 in the group 12. In this case, the terminal device 200 transmits the reselection request to the master UE 200M. The master UE 200M that has received the reselection request transmits the reselection trigger in a case where the own device can transmit the reselection trigger. On the other hand, when the base station 100 transmits the reselection trigger, the master UE 200M transfers the reselection request to the base station 100.

The terminal device 200 that has received the reselection trigger transmits information to be used for reselection of the plurality of master UEs 200M to the base station 100 based on the reselection trigger. The information to be used for reselection can be transmitted to the base station 100 via, for example, the plurality of master UEs 200M. The information to be used for reselection may be the same as the determination information to be used for determination of the plurality of master UEs 200M.

In addition, reselection of all the plurality of master UEs 200M may be performed by the reselection trigger, or reselection of at least one master UE 200M may be performed.

<3.3. Others>

In the determination method described above, the terminal device 200 or the base station 100 determines the plurality of master UEs 200M, but the present disclosure is not limited thereto. A person other than the terminal device 200 and the base station 100 may determine the plurality of master UEs 200M.

For example, an installer who installs the terminal device 200 or a user who uses the service of the communication system 1 may determine the plurality of master UEs 200M. For example, it is assumed that the terminal device 200 belonging to the group 12 is a sensor, a camera, or the like installed in the vehicle, and the communication system 1 is a system that provides an intra-vehicle network service.

In this case, for example, an installer who installs a sensor, a camera, or the like in the vehicle may determine the plurality of master UEs 200M at the time of system construction. The installer can determine the plurality of master UEs 200M according to, for example, the position of the terminal device 200 and the type of function to be provided (for example, the type of sensor, and the like).

Alternatively, for example, a user who uses the intra-vehicle network service such as a driver may determine the plurality of master UEs 200M before using the service. Hereinafter, the installer and the user are also collectively referred to as a determiner.

The determiner determines the plurality of master UEs 200M based on, for example, information displayed on a display device (not illustrated) such as a display provided in the vehicle.

The display device can display, for example, terminal information on the terminal device 200 that is a candidate of the plurality of master UEs 200M (hereinafter, the same is also referred to as a candidate terminal). Such terminal information includes, for example, identification information for identifying a candidate terminal, a display name set for the candidate terminal, and the like.

The terminal information and the determination information may be displayed on the display device in association with each other. For example, a list in which terminal information and received power of a candidate terminal corresponding to the terminal information are associated with each other can be displayed. The received power may be displayed as numerical information or may be displayed as icon information indicating intensity.

Further, when the determination information is information indicating the installation position of the candidate terminal, the terminal information of the candidate terminal can be displayed on the display device together with a peripheral situation (for example, a map or a vehicle image). For example, on the display device, an icon indicating the candidate terminal can be superimposed and displayed on an image diagram of the vehicle.

When the terminal information is displayed on the display device, a display method can be changed according to the priority (degree of recommendation) as candidates of a plurality of the master UE 200M. For example, the display device may display the terminal information in a highlighted manner according to the priority, such as changing the display color or changing the size of characters according to the priority of the plurality of master UEs 200M.

The determiner selects at least one of the plurality of master UEs 200M based on the terminal information displayed on the display device. The determiner selects at least one of the plurality of master UEs 200M using, for example, a mouse, a keyboard, a touch panel, or the like.

When the determiner selects some of the master UEs 200M among the plurality of master UEs 200M, the terminal device 200 belonging to the group 12 or the base station 100 determines the remaining master UEs 200M. For example, the terminal device 200 belonging to the group 12 or the base station 100 can determine the remaining master UE 200M based on the above-described determination method.

For example, in a case where the plurality of master UEs 200M include the pm UE 200MP and the sm UE 200MS, the determiner may determine the pm UE 200MP, and the terminal device 200 or the base station 100 may determine the sm UE 200MS.

In this manner, the determiner can also set at least one of the plurality of master UEs 200M.

It is noted that reselection of the plurality of master UEs 200M may also be performed by the determiner in the same manner as the selection of the plurality of master UEs 200M.

In addition, a device other than the determiner may determine the plurality of master UEs 200M. For example, a device other than the terminal device 200 and the base station 100, such as a node of a core network of the communication system 1, may determine the plurality of master UEs 200M.

4. Type of Master UE

As described above, the plurality of master UEs 200M can have priority (hierarchy) set according to a function. For example, the plurality of master UEs 200M may be divided into one primary master UE (pm UE) 200MP and at least one secondary master UE (sm UE) 200MS.

When there are a plurality of sm UEs 200MS, the priority order (hierarchy) may be set among the plurality of sm UEs 200MS.

A method of setting the pm UE 200MP and the sm UE 200MS is the same as the method of determining the plurality of master UEs 200M described above. It is noted that different determination methods may be adopted for the pm UE 200MP and the sm UE 200MS.

For example, the base station 100 may determine the pm UE 200MP, and the terminal device 200 may determine the sm UE 200MS. Alternatively, when the pm UE 200MP may be determined based on the received power, and the sm UE 200MS may be determined based on the position information of the terminal device 200, the determination information to be used for determination may be different.

The pm UE 200MP and the sm UE 200MS may be respectively assigned different roles to implement different functions.

(Function of Pm UE 200MP)

The pm UE 200MP may implement at least one of the following functions.

Communication with base station 100
    Control of terminal device 200
    Determination of physical resource
    Determination of sm UE 200MS
    Communication control of sm UE 200MS

[Communication with Base Station 100]

The pm UE 200MP has a communication function with the base station 100 and is assigned a role of communicating with the base station 100. That is, the pm UE 200MP communicates with the base station 100 as a representative of the group 12.

[Control of Terminal Device 200]

The pm UE 200MP controls transmission of a signal or control information related to a predetermined function with respect to at least one of the sm UE 200MS and all the terminal devices 200 in the group 12, thereby controlling these devices.

Here, the predetermined function includes at least one of the following functions.

Resource selection and/or sensing
    Synchronization (frame synchronization and symbol synchronization)
    HARQ feedback
    Channel state information (CSI) report (Resource Selection and/or Sensing)

For example, the pm UE 200MP transmits information (for example, permission list information and acceptable list information) related to a resource suitable for transmission by a predetermined terminal device 200 to at least one of the sm UE 200MS and all the terminal devices 200 in the group 12. Specifically, information related to a resource unreserved by another terminal device 200 is transmitted. Here, another terminal device 200 may be a terminal device 200 that belongs to the same group 12 as the pm UE 200MP, or may be a terminal device 200 that belongs to a different group 12.

For example, the pm UE 200MP transmits information (for example, block list information and drop list information) related to a resource unsuitable for transmission by a predetermined terminal device 200 to at least one of the sm UE 200MS and all the terminal devices 200 in the group 12. Specifically, information on a resource already reserved by another terminal device 200 is transmitted. Here, another terminal device 200 may be a terminal device 200 that belongs to the same group 12 as the pm UE 200MP, or may be a terminal device 200 that belongs to a different group 12.

(Synchronization)

The pm UE 200MP transmits, for example, a sidelink-synchronization signal and physical broadcast channel block (S-SSB) as a signal and a channel necessary for synchronization.

(Harq Feedback)

The pm UE 200MP sets, for example, resources of a channel (for example, PSFCH) necessary for HARQ feedback.

(CSI Report)

The pm UE 200MP sets, for example, resources of a channel (for example, PSSCH and PSFCH) necessary for the CSI report.

[Determination of physical resource]

The pm UE 200MP determines, for example, physical resources (for example, resource pool and sidelink bandwidth part (Sidelink BWP)) in the group 12.

For example, the pm UE 200MP determines the same physical resource as the physical resource set by the base station 100 as the physical resource in the group 12.

Alternatively, the pm UE 200MP may determine and provide notification of an individual physical resource for each sm UE 200MS or each terminal device 200 in the group 12.

[Determination of Sm UE 200MS]

The pm UE 200MP determines, for example, the sm UE 200MS in the group 12. A method of determining the sm UE 200MS by the pm UE 200MP may be, for example, the same method as the method of determining the plurality of master UEs 200M by the base station 100. The pm UE 200MP notifies the sm UE 200MS or the terminal device 200 in the group 12 of information on the determined sm UE 200MS.

In addition, when the plurality of sm UEs 200MS are set, a subgroup of the terminal devices 200 that perform communication can be formed for each sm UE 200MS. In this case, the pm UE 200MP may determine the subgroup. For example, the pm UE 200MP sets the subgroup by determining at least one terminal device 200 that performs communication for each sm UE 200MS.

[Communication Control of Sm UE 200MS]

The pm UE 200MP controls, for example, communication with the base station 100 by the sm UE 200MS. For example, the pm UE 200MP controls data and information transmitted from the sm UE 200MS to the base station 100. Such control may include control of contents of information to be transmitted, transmission timing, a channel to be used for transmission, and the like. Similarly, the pm UE 200MP may control data and information received from the base station 100 by the sm UE 200MS.

(Function of Sm UE 200MS)

The sm UE 200MS may implement at least one of the following functions.

Communication with base station 100

Communication with pm UE 200MP

Control of terminal device 200 of subgroup

The sm UE 200MS has a communication function with the base station 100, and may be assigned a role of performing communication with the base station 100. That is, the sm UE 200MS can communicate with the base station 100 as a representative of the group 12.

In addition, the sm UE 200MS has a communication function with the pm UE 200MP, and can be assigned a role of performing communication with the pm UE 200MP. For example, when at least one subgroup is set for the group 12, the sm UE 200MS may communicate with the pm UE 200MP as a representative of the subgroup.

The sm UE 200MS controls transmission of a signal or control information related to a predetermined function with respect to the terminal device 200 (for example, the terminal device 200 belonging to the subgroup) to be controlled by the own device, thereby controlling the terminal device 200. It is noted that the predetermined function is the same as the function described above.

As described above, in the embodiment of the present disclosure, the plurality of master UEs 200M can be set from among the terminal devices 200 in the group 12. As a result, it is possible to provide the communication system 1 capable of realizing lower delay and higher reliability. In addition, even in a case where a new terminal device 200 is added to the group 12, a plurality of master UEs 200M can be reset, and the group 12 can be more easily constructed.

5. Other Embodiments

In the embodiment described above, the master UE 200M communicates with the base station 100 or the terminal device 200 in the group 12, but the present disclosure is not limited thereto. The master UE 200M may communicate with the master UE 200M of another group 12 or the terminal device 200 of another group 12.

For example, the plurality of master UEs 200M may perform sidelink communication with the terminal devices 200 of another group 12 in addition to communication with the base station 100 as a representative of the group 12.

Alternatively, the plurality of master UEs 200M may include the master UE 200M that communicates with the base station 100 and the master UE 200M that communicates with the terminal device 200 of another group 12.

6. Application Example (Intra-Vehicle Communication)

The technology according to the present disclosure (present technology) can be applied to various systems. For example, the technology according to the present disclosure may be applied to an intra-vehicle network of an automobile.

Figure 9:
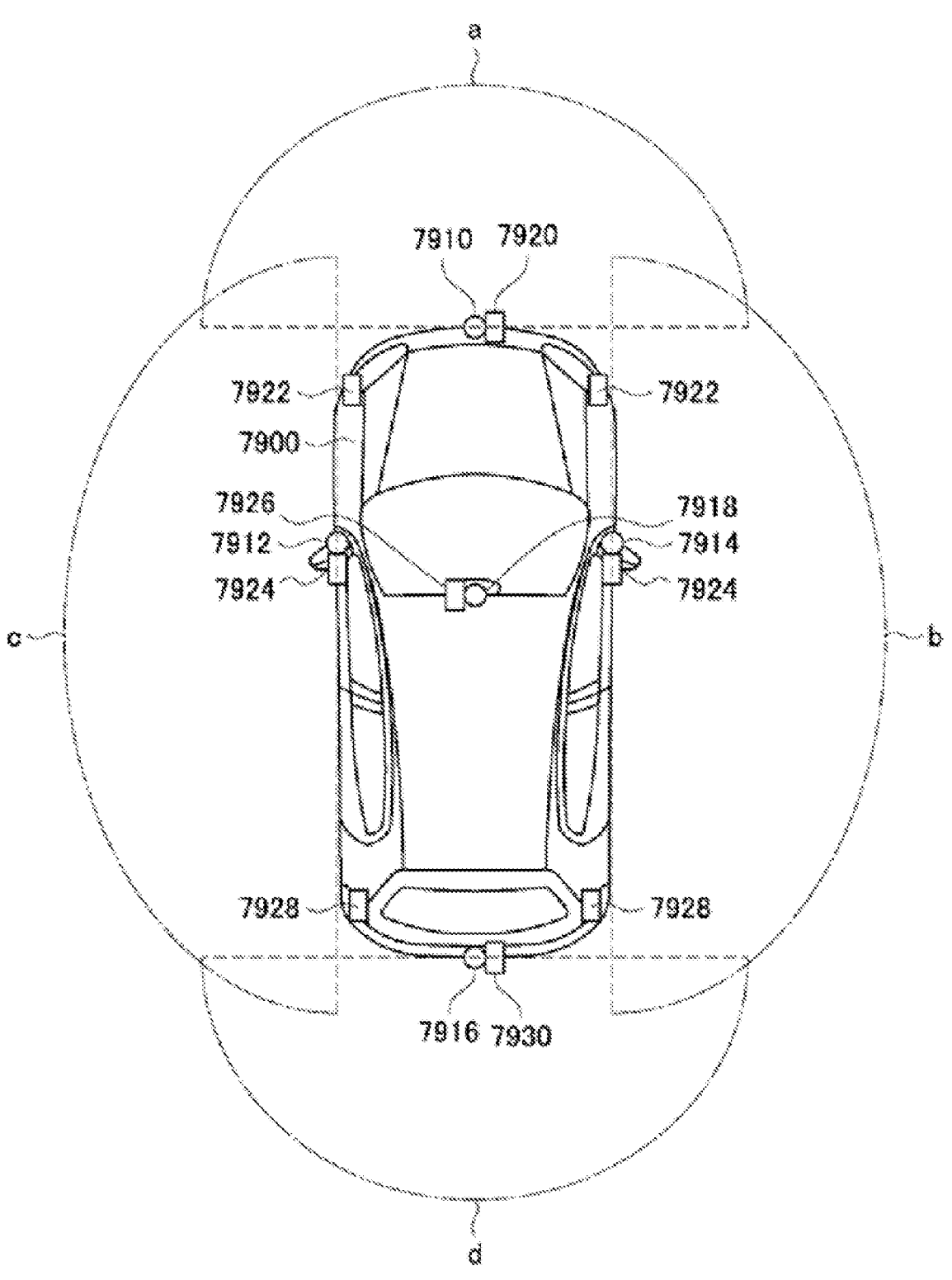
FIG. 9 is a diagram illustrating an application example of the communication system according to the embodiment of the present disclosure.

FIG. 9 is a diagram illustrating an application example of the communication system 1 according to the embodiment of the present disclosure. In a case where the technology according to the present disclosure is applied to an intra-vehicle network of an automobile, for example, one group 12 is formed by a plurality of sensors and cameras mounted on the automobile.

In the example of FIG. 9, cameras 7910, 7912, 7914, 7916, and 7918 are mounted on a vehicle 7900. In addition, sensors 7920, 7926, and 7930 are mounted on the vehicle 7900. The cameras 7910, 7912, 7914, 7916, and 7918 and the LIDAR devices 7920, 7926, and 7930 have a communication function and correspond to the terminal devices 200 belonging to the same group 12 of the embodiments of the present disclosure.

The cameras 7910, 7912, 7914, 7916, and 7918 are provided, for example, at least one position of a front nose, a side mirror, a rear bumper, a back door, or an upper portion of a windshield in a vehicle interior of the vehicle 7900. FIG. 9 illustrates an example of imaging ranges of the respective cameras 7910, 7912, 7914, 7916, and 7918. An imaging range a indicates an imaging range of the camera 7910 provided at the front nose, imaging ranges b and c indicate imaging ranges of the cameras 7912 and 7914 respectively provided at the side mirrors, and an imaging range d indicates an imaging range of the camera 7916 provided at the rear bumper or the back door.

The sensors 7920, 7926, and 7930 are, for example, LIDAR devices, and are mainly used for detecting a preceding vehicle, a pedestrian, an obstacle, or the like.

For example, the cameras 7910, 7912, 7914, 7916, and 7918 and the sensors 7920, 7926, and 7930 judge whether or not the own device is one of the plurality of master UEs 200M. When the own device is one of the plurality of master UEs 200M, the device communicates with another terminal device 200 in the group 12 and communicates with the base station 100 (not illustrated).

As described above, by applying the present technology to intra-vehicle communication, the base station 100 can perform communication on a vehicle-by-vehicle basis. In addition, by setting a plurality of master UEs 200M, it is possible to perform communication with lower delay and higher reliability.

It is noted that, although the case where the present technology is applied to intra-vehicle communication has been described here, the present technology can also be applied to inter-vehicle communication. In this case, one group 12 is formed by a plurality of vehicles.

(Smart Factory)

The technology according to the present disclosure may be applied to a smart factory utilizing an artificial intelligence (AI) technology or an internet of things (IoT) technology. For example, in an automation factory, devices are automatically controlled using various data acquired from the devices disposed in the factory.

Figure 10:
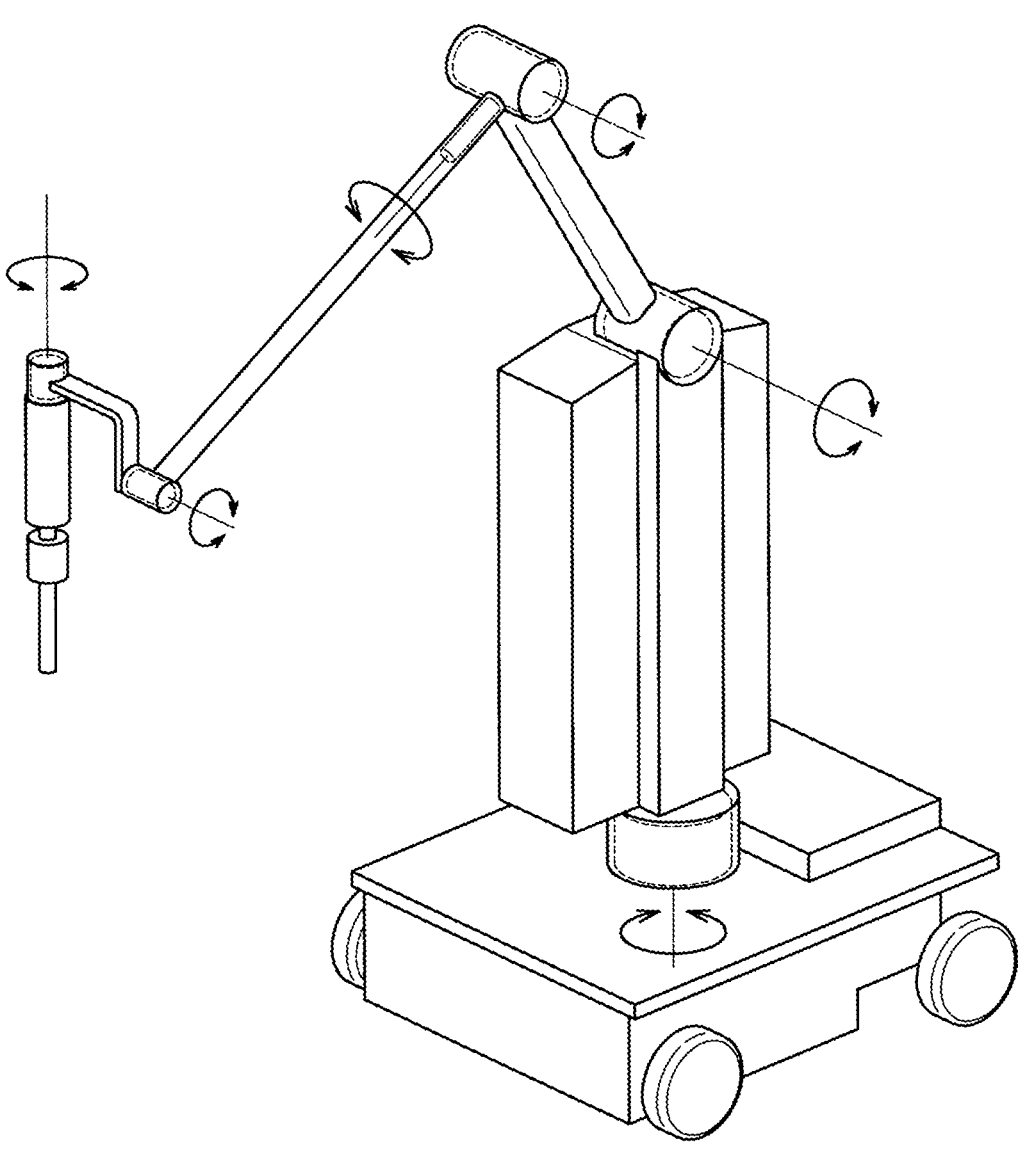
FIG. 10 is a diagram illustrating an application example of the communication system according to the embodiment of the present disclosure.

FIG. 10 is a diagram illustrating an application example of the communication system 1 according to the embodiment of the present disclosure. For example, in the automation factory, a large number of industrial robots as illustrated in FIG. 10 are installed in a factory. In the robot, for example, a sensor or a motor is disposed for each joint, and the sensor detects the angle, speed, and the like of the joint and transmits control information to the motor.

At this time, for example, one group 12 is formed by a plurality of sensors and motors mounted on one robot. That is, the plurality of sensors and motors mounted on the robot have a communication function and function as the terminal devices 200 belonging to one group 12. As a result, the base station 100 (not illustrated) installed in the factory can perform communication on a robot-by-robot basis, and addition, change, and the like of robots can be easily performed.

In addition, by setting the plurality of master UEs 200M from among the terminal devices 200 included in the group 12, it is possible to perform communication with lower delay and higher reliability.

It is noted that, although the case where the technology of the present disclosure is applied to the automation factory has been described here, the present technology can also be applied to an automated guided vehicle (AGV). In this case, for example, the group 12 is formed for each vehicle that automatically travels according to a guide in the factory.

(Smart Surgery)

Furthermore, the technology according to the present disclosure may be applied to smart surgery utilizing an artificial intelligence (AI) technology or an Internet of Things (IoT) technology. For example, the present technology can be applied to remote surgery.

Figure 11:
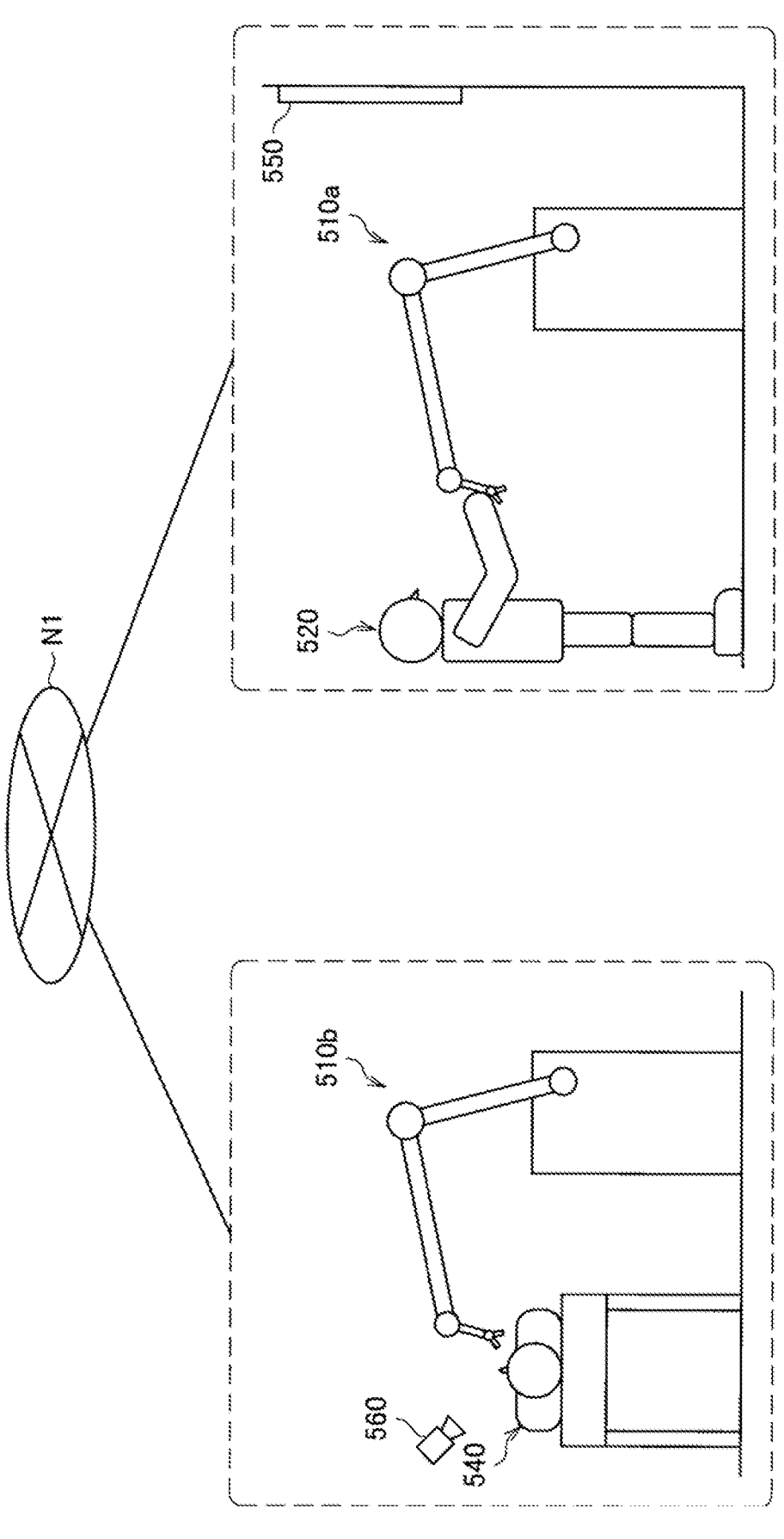
FIG. 11 is a diagram illustrating an application example of the communication system according to the embodiment of the present disclosure.

FIG. 11 is a diagram illustrating an application example of the communication system 1 according to the embodiment of the present disclosure. As illustrated in FIG. 11, when a practitioner 520 operates an arm device 510a in a state where the practitioner 520 and a patient 540 are away from each other, an arm device 510b operates in the same manner, and surgery on the patient 540 is performed. For example, the practitioner 520 performs surgery while checking an image captured by a camera 560 installed near the patient

540 and displayed on a display device 550. It is noted that the places (remote places) distant from each other may be, for example, different hospitals, adjacent rooms in the same hospital, or positions distant from each other in the same operating room.

The arm devices 510a and 510b, the camera 560, and the display device 550 are connected to each other via, for example, a network N1.

At this time, for example, it is assumed that one group 12 is formed by the arm device 510a and the display device 550 disposed in a space (for example, an operating room or the like) where the practitioner 520 is present. In this case, the master UE 200M of the group 12 is connected to the network N1 via the base station 100 (not illustrated). That is, the arm device 510a and the display device 550 have a communication function and correspond to the terminal device 200 of the present technology.

Furthermore, it is assumed that one group 12 is formed by the arm device 510b and the camera 560 disposed in a space (for example, an operating room or the like) where the patient 540 is present. In this case, the master UE 200M of the group 12 is connected to the network N1 via the base station 100 (not illustrated). That is, the arm device 510b and the camera 560 have a communication function and correspond to the terminal device 200 of the present technology.

It is noted that, in addition to the arm devices 510a and 510b, the display device 550, and the camera 560 described above, various devices disposed in the operating room, such as a sensor that detects the state of the patient 540 and an illumination device, can correspond to the terminal devices 200 of the present technology.

Alternatively, a sensor or the like mounted on the arm devices 510a and 510b may correspond to the terminal device 200 of the present technology.

In the present technology, a plurality of master UEs 200M are set from among the terminal devices 200 included in the group 12. Accordingly, low-delay and highly reliable communication can be performed.

It is noted that, although the case where the technology of the present disclosure is applied to the remote surgery has been described here, the present disclosure is not limited thereto. The present technology can also be applied to, for example, automatic surgery.

7. Summary

Each step in the processing executed by each device in the present specification does not necessarily need to be processed in time series in the order described as the sequence diagram. For example, each step in the processing executed by each device may be processed in an order different from the order described as the sequence diagram, or may be processed in parallel.

In addition, it is also possible to generate a computer program for causing hardware such as a CPU, a ROM, and a RAM built in each device to perform a function equivalent to the configuration of each device described above. Furthermore, a storage medium storing the computer program can also be provided. Furthermore, by configuring each functional block illustrated in the functional block diagram by hardware, a series of processing can be implemented by hardware.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these changes or modifications also belong to the technical scope of the present disclosure.

Furthermore, the effects described in the present specification are merely illustrative or exemplary, and are not restrictive. That is, the technology according to the present disclosure can exhibit other effects obvious to those skilled in the art from the description of the present specification together with or instead of the above effects.

It is noted that the present technology can also have the following configurations.

(1)

A wireless communication device configured to perform sidelink communication by a plurality of the wireless communication devices, the wireless communication device comprising a control unit configured to:

acquire determination information for determining a plurality of master devices configured to communicate with a base station in the sidelink communication; and determine, based on the determination information, whether or not an own device is one of the plurality of master devices.

(2)

The wireless communication device according to (1), wherein the control unit transmits the determination information to each of the plurality of wireless communication devices configured to perform the sidelink communication.

(3)

The wireless communication device according to (1) or (2), wherein the control unit receives the determination information from each of the plurality of wireless communication devices.

(4)

The wireless communication device according to any one of (1) to (3), wherein the control unit receives the determination information from the base station.

(5)

The wireless communication device according to (4), wherein the determination information includes at least one of candidate information on the wireless communication device serving as a candidate for the plurality of master devices and exclusion information on the wireless communication device to be excluded from the plurality of master devices.

(6)

The wireless communication device according to any one of (1) to (5), wherein the determination information includes at least one of received power with the base station, position information of the plurality of wireless communication devices, capability information of the plurality of wireless communication devices, and information indicating whether or not each of the plurality of wireless communication devices exists within coverage of the base station.

(7)

The wireless communication device according to any one of (1) to (6), wherein the control unit transmits, when determining that the own device is the master device, a determination result to at least one of the base station and the plurality of wireless communication devices.

(8)

The wireless communication device according to any one of (1) to (7), wherein the control unit redetermines, when a reselection condition for reselecting the master device is satisfied, whether or not the own device is the master device.

(9)

The wireless communication device according to any one of (1) to (8), wherein the plurality of master devices include a first master device, a priority of communication with the base station of which is high, and a second master device, the priority of which is low.

(10)

The wireless communication device according to (9), wherein the first master device communicates with the base station, and wherein the second master device communicates with the base station according to a communication state between the first master device and the base station.

(11)

The wireless communication device according to (9) or (10), wherein the first master device communicates with the base station, wherein the second master device performs the sidelink communication with the first master device, and wherein the plurality of wireless communication devices perform the sidelink communication with the second master device.

(12)

A base station comprising a control unit configured to:

acquire determination information for determining a plurality of master devices configured to communicate with the base station from among a plurality of wireless communication devices configured to perform sidelink communication;

determine the plurality of master devices based on the determination information; and provide notification of information on the determined plurality of master devices.

(13)

A communication system comprising:

a plurality of wireless communication devices configured to perform sidelink communication; and a base station configured to communicate with at least one of the plurality of wireless communication devices, wherein the wireless communication device includes a control unit configured to:

acquire determination information for determining a plurality of master devices configured to communicate with the base station; and determine, based on the determination information, whether or not an own device is one of the plurality of master devices.

(14)

A communication method by a wireless communication device configured to perform sidelink communication using a plurality of the wireless communication devices, the communication method comprising:

acquiring determination information for determining a plurality of master devices configured to communicate with a base station in the sidelink communication; and determining, based on the determination information, whether or not an own device is one of the plurality of master devices.

(15)

A communication method comprising:

acquiring, from among a plurality of wireless communication devices configured to perform sidelink communication, determination information for determining a plurality of master devices configured to communicate with a base station;

determining the plurality of master devices based on the determination information; and providing notification of information on the determined plurality of master devices.

REFERENCE SIGNS LIST

100 BASE STATION
200 TERMINAL DEVICE
200M MASTER UE
110, 210 ANTENNA UNIT
120, 220 WIRELESS COMMUNICATION UNIT
130 NETWORK COMMUNICATION UNIT
140, 230 STORAGE UNIT
150, 240 CONTROL UNIT
151, 241 DETERMINATION UNIT
242 JUDGEMENT UNIT
152, 243 NOTIFICATION UNIT

The invention claimed is:

1. A wireless communication device, comprising:
a control unit configured to:
    control the wireless communication device to execute sidelink communication with a plurality of wireless communication devices in a per-vehicle group, wherein the plurality of wireless communication devices includes the wireless communication device;
    acquire determination information to determine for determining a plurality of master devices, wherein
        the plurality of master devices is configured to communicate with a base station in the sidelink communication,
        the determination information includes information related to received power with the base station, position information of the plurality of wireless communication devices, capability information of the plurality of wireless communication devices, and coverage information indicating whether each wireless communication device of the plurality of wireless communication devices exists within a coverage of the base station,
        the plurality of master devices includes a first master device and a second master device, and
        a priority of communication of the first master device with the base station is higher than a priority of communication of the second master device with the base station;
    determine, based on the acquired determination information, whether the wireless communication device is one of the plurality of master devices; and
    transmit, based on the determination that the wireless communication device is one of the plurality of master devices, a determination result to at least one of the base station or the plurality of wireless communication devices.

2. The wireless communication device according to claim 1, wherein the control unit is further configured to transmit the determination information to the each wireless communication device of the plurality of wireless communication devices.

3. The wireless communication device according to claim 1, wherein the control unit is further configured to receive the determination information from the each wireless communication device of the plurality of wireless communication devices.

4. The wireless communication device according to claim 1, wherein the control unit is further configured to receive the determination information from the base station.

5. The wireless communication device according to claim 4, wherein the determination information further includes at least one of:
    candidate information on the wireless communication device that serves as a candidate for the plurality of master devices, and
    exclusion information on the wireless communication device that is excluded from the plurality of master devices.

6. The wireless communication device according to claim 1, wherein the control unit is further configured to determine, in a case where a reselection condition to reselect one of the plurality of master devices is satisfied, that the wireless communication device is one of the plurality of master devices.

7. The wireless communication device according to claim 1, wherein
    the first master device communicates with the base station, and
    the second master device communicates with the base station based on a communication state between the first master device and the base station.

8. The wireless communication device according to claim 1, wherein
    the first master device communicates with the base station,
    the second master device executes the sidelink communication with the first master device, and
    the each wireless communication device of the plurality of wireless communication devices executes the sidelink communication with the second master device.

9. A base station, comprising:
a control unit configured to:
    acquire determination information, from a plurality of wireless communication devices, to determine a plurality of master devices, wherein
        the plurality of master devices is configured to communicate with the base station,
        the determination information includes information related to received power with the base station, position information of the plurality of wireless communication devices, capability information of the plurality of wireless communication devices, and coverage information indicating whether each wireless communication device of the plurality of wireless communication devices exists within a coverage of the base station, and
        the each wireless communication device of the plurality of wireless communication devices communicates in perform-sidelink communication in a per-vehicle group;
    determine the plurality of master devices based on the determination information, wherein
        the plurality of master devices includes a first master device and a second master device, and
        a priority of communication of the first master device with the base station is higher than a priority of communication of the second master device with the base station; and
    transmit notification to the plurality of wireless communication devices of information on the determined plurality of master devices.

10. A communication system, comprising:
a plurality of wireless communication devices configured to execute sidelink communication in a per-vehicle group; and a base station configured to communicate with at least one wireless communication device of the plurality of wireless communication devices, wherein the at least one wireless communication device includes a control unit configured to:

acquire determination information to determine a plurality of master devices, wherein the plurality of master devices is further configured to communicate with the base station, the determination information includes information related to received power with the base station, position information of the plurality of wireless communication devices, capability information of the plurality of wireless communication devices, and coverage information indicating whether each wireless communication device of the plurality of wireless communication devices exists within a coverage of the base station, the plurality of master devices includes a first master device and a second master device, and a priority of communication of the first master device with the base station is higher than a priority of communication of the second master device with the base station;

determine, based on the determination information, whether the at least one wireless communication device is one of the plurality of master devices; and transmit, based on the determination that the at least one wireless communication device is one of the plurality of master devices, a determination result to at least one of the base station or the plurality of wireless communication devices.

11. A communication method by a wireless communication device, the communication method comprising:

controlling the wireless communication device to execute sidelink communication with a plurality of wireless communication devices in a per-vehicle group, wherein the plurality of wireless communication devices includes the wireless communication device;

acquiring determination information for determining a plurality of master devices, wherein the plurality of master devices is configured to communicate with a base station in the sidelink communication, the determination information includes information related to received power with the base station, position information of the plurality of wireless communication devices, capability information of the plurality of wireless communication devices, and coverage information indicating whether each wireless communication device of the plurality of wireless communication devices exists within a coverage of the base station, the plurality of master devices includes a first master device and a second master device, and a priority of communication of the first master device with the base station is higher than a priority of communication of the second master device with the base station is low;

determining, based on the acquired determination information, whether the wireless communication device is one of the plurality of master devices; and transmitting, based on the determination that the wireless communication device is one of the plurality of master devices, a determination result to at least one of the base station or the plurality of wireless communication devices.

12. A communication method, comprising:

acquiring, from a plurality of wireless communication devices configured to execute sidelink communication in a per-vehicle group, determination information for determining a plurality of master devices, wherein the plurality of master devices is configured to communicate with a base station, and the determination information includes information corresponding to received power with the base station, position information of the plurality of wireless communication devices, capability information of the plurality of wireless communication devices, and coverage information indicating whether each wireless communication device of the plurality of wireless communication devices exists within a coverage of the base station;

determining the plurality of master devices based on the determination information, wherein the plurality of master devices includes a first master device and a second master device, and a priority of communication of the first master device with the base station is higher than a priority of communication of the second master device with the base station; and transmitting notification to the plurality of wireless communication devices providing notification of information on the determined plurality of master devices.

* * * * *